(12) United States Patent
Hatanaka et al.

(10) Patent No.: US 7,991,832 B2
(45) Date of Patent: Aug. 2, 2011

(54) INFORMATION PROCESSING APPARATUS, INFORMATION PROCESSING METHOD AND COMPUTER PROGRAM

(75) Inventors: Kentaro Hatanaka, Tokyo (JP); Shinichiro Torii, Kanagawa (JP); Hidehito Suzuki, Kanagawa (JP); Kouichi Kasai, Saitama (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 245 days.

(21) Appl. No.: 12/056,634

(22) Filed: Mar. 27, 2008

(65) Prior Publication Data
US 2008/0250100 A1 Oct. 9, 2008

(30) Foreign Application Priority Data

Apr. 3, 2007 (JP) ................................. 2007-097857

(51) Int. Cl.
*G06F 15/16* (2006.01)
(52) U.S. Cl. ........................................ 709/203; 709/217
(58) Field of Classification Search .......... 709/201–203, 709/217–219, 223–230
See application file for complete search history.

(56) References Cited

U.S. PATENT DOCUMENTS

| | | | |
|---|---|---|---|
| 6,662,231 B1 * | 12/2003 | Drosset et al. ................. | 709/229 |
| 2003/0112729 A1 | 6/2003 | Nichols et al. | |
| 2004/0010691 A1 * | 1/2004 | Nelson ........................... | 713/176 |
| 2006/0265369 A1 | 11/2006 | Atcheson et al. | |
| 2007/0028110 A1 * | 2/2007 | Brennan ........................ | 713/176 |
| 2007/0061584 A1 * | 3/2007 | Takashima et al. ........... | 713/176 |
| 2007/0136282 A1 * | 6/2007 | Takashima ..................... | 707/6 |
| 2008/0134340 A1 * | 6/2008 | Ueda et al. ..................... | 726/26 |

FOREIGN PATENT DOCUMENTS

| | | |
|---|---|---|
| WO | WO 99/38092 | 7/1999 |
| WO | WO 01/46843 A2 | 6/2001 |
| WO | WO 01/46843 A3 | 6/2001 |
| WO | WO 01/47257 A1 | 6/2001 |
| WO | WO 03/012695 A2 | 2/2003 |
| WO | WO 03/067466 A2 | 8/2003 |
| WO | WO 2005/006758 A1 | 1/2005 |

OTHER PUBLICATIONS

U.S. Appl. No. 11/937,702, filed Nov. 9, 2007, Kenjiro Ueda, et al.

(Continued)

*Primary Examiner* — Yasin Barqadle
(74) *Attorney, Agent, or Firm* — Oblon, Spivak, McClelland, Maier & Neustadt, L.L.P.

(57) ABSTRACT

An information processing apparatus, that obtains pieces of content information relating to content recorded in an information recording medium, includes a content identifier generation unit configured to read a content certificate which is recorded in the recording medium and which corresponds to the content stored in the information recording medium, and generates a content identifier by combining hash values which correspond to the content and which are included in data stored in the content certificate, a data transmitting unit configured to transmit the content identifier generated using the content identifier generation unit to a content information provision server, a data receiving unit configured to receive, from the content information provision server, the pieces of content information relating to the content which is specified on the basis of the content identifier, and a data outputting unit configured to output the pieces of content information received using the data receiving unit.

28 Claims, 18 Drawing Sheets

OTHER PUBLICATIONS

"Advanced Access Content System (AACS)", Pre-recorded Video Book, Revision 0.91. Feb. 17, 2006, 61 Pages.

"Advanced Access Content System (AACS) Introduction and Common Cryptographic Elements", Revision 0.91, XP-002438245, Feb. 17, 2006, pp. I-XII, pp. 1-70.

"Advanced Access Content System (AACS) blu-ray Disc Pre-recorded Book", Revision 0.91, XP-007900016, Feb. 17, 2006, pp. 1-12 pp. 1-77.

* cited by examiner

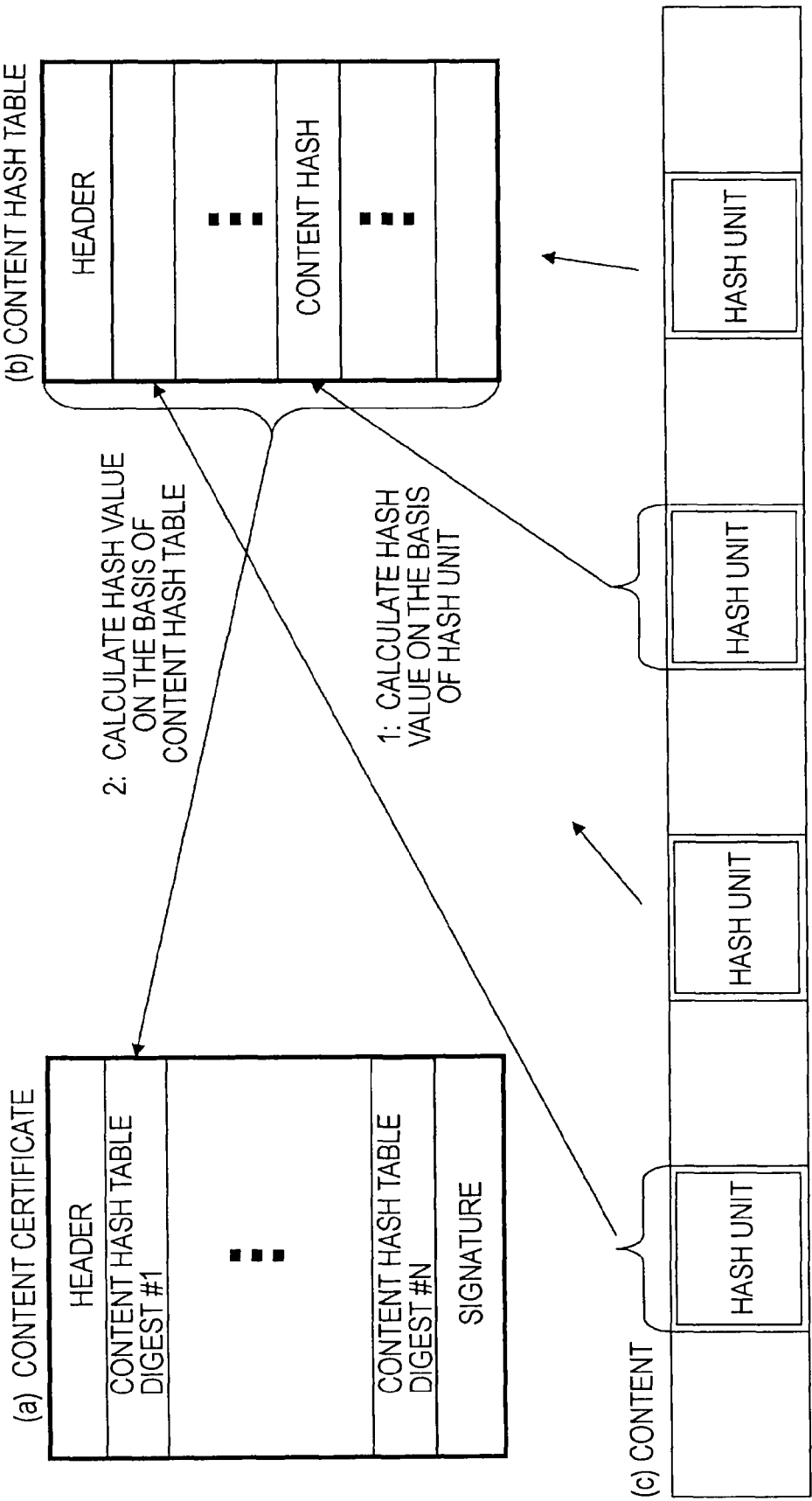

FIG. 5

| BYTE | BIT 7 ... 0 | |
|---|---|---|
| 0 | Certificate Type: 00₁₆ | |
| 1 | (reserved) | |
| 2...5 | Total_Number_of_HashUnits | |
| 6 | Total_Number_of_Layers | |
| 7 | Layer_Number | |
| 8...11 | Number_of_HashUnits | |
| 12,13 | Number_of_Digests | |
| 14,15 | Applicant ID | 202 |
| 16...19 | Content Sequent Number | 203 |
| 20,21 | Minimum CRL Version | |
| 22,23 | (reserved) | |
| 24,25 | Length_Format_Specific_Section | |
| 26...46 | Hash_Value_of_MC_Manifest_File | |
| 47...65 | Hash_Value_of_BDJ_Root_Cert | |
| 66,67 | Num_of_CPS_Unit | |
| 68...87 | Hash_Value_of_CPS_Unit_Usage_File#1 | |
| ... | ... | |
| 68+(J-1)*20...87+(J-1)*20 | Hash_Value_of_CPS_Unit_Usage_File#J | |
| K...K+7 | Content Hash Table Digest #1 | 201 |
| ... | ... | |
| K+(N-1)*8...K+7+(N-1)*8 | Content Hash Table Digest #N | |
| K+8+(N-1)*8...K+47+(N-1)*8 | Signature Data | |

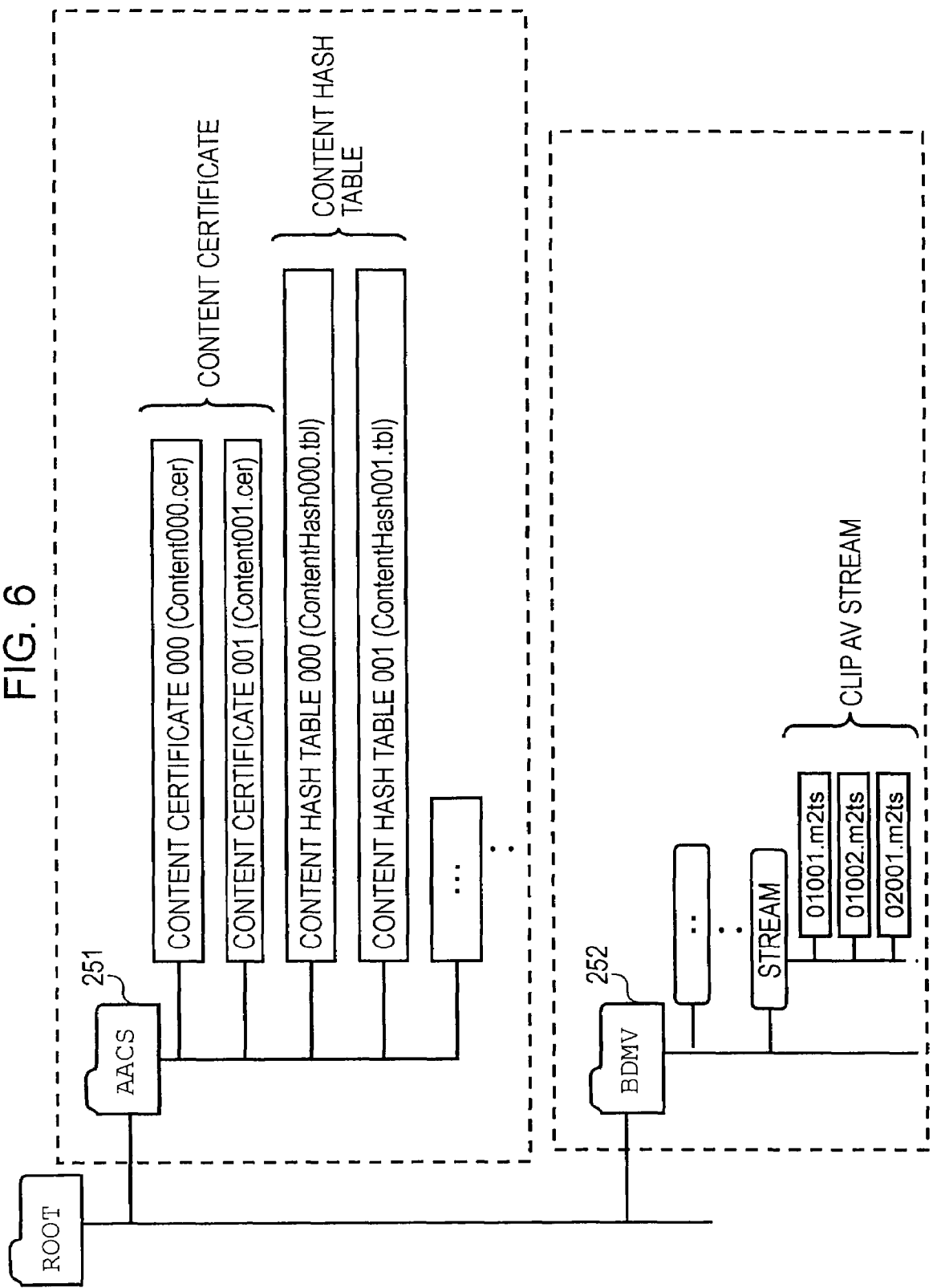

FIG. 15

| CLIENT A (USER A) | CLIENT B (USER B) | CLIENT C (USER C) | CLIENT D (USER D) |
|---|---|---|---|
| CONTENTaa | CONTENTaa | CONTENTfc | CONTENTpu |
| CONTENTab | CONTENTfd | CONTENTkj | .. |
| CONTENTca | CONTENTfc | .. | |
| .. | .. | | |
| CONTENTca | | | |

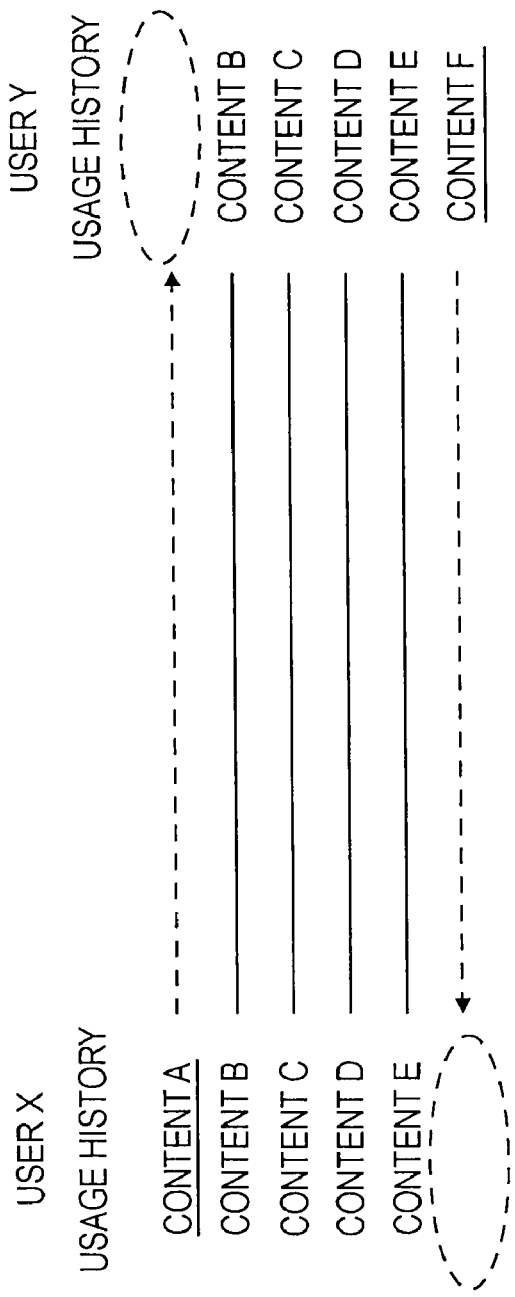

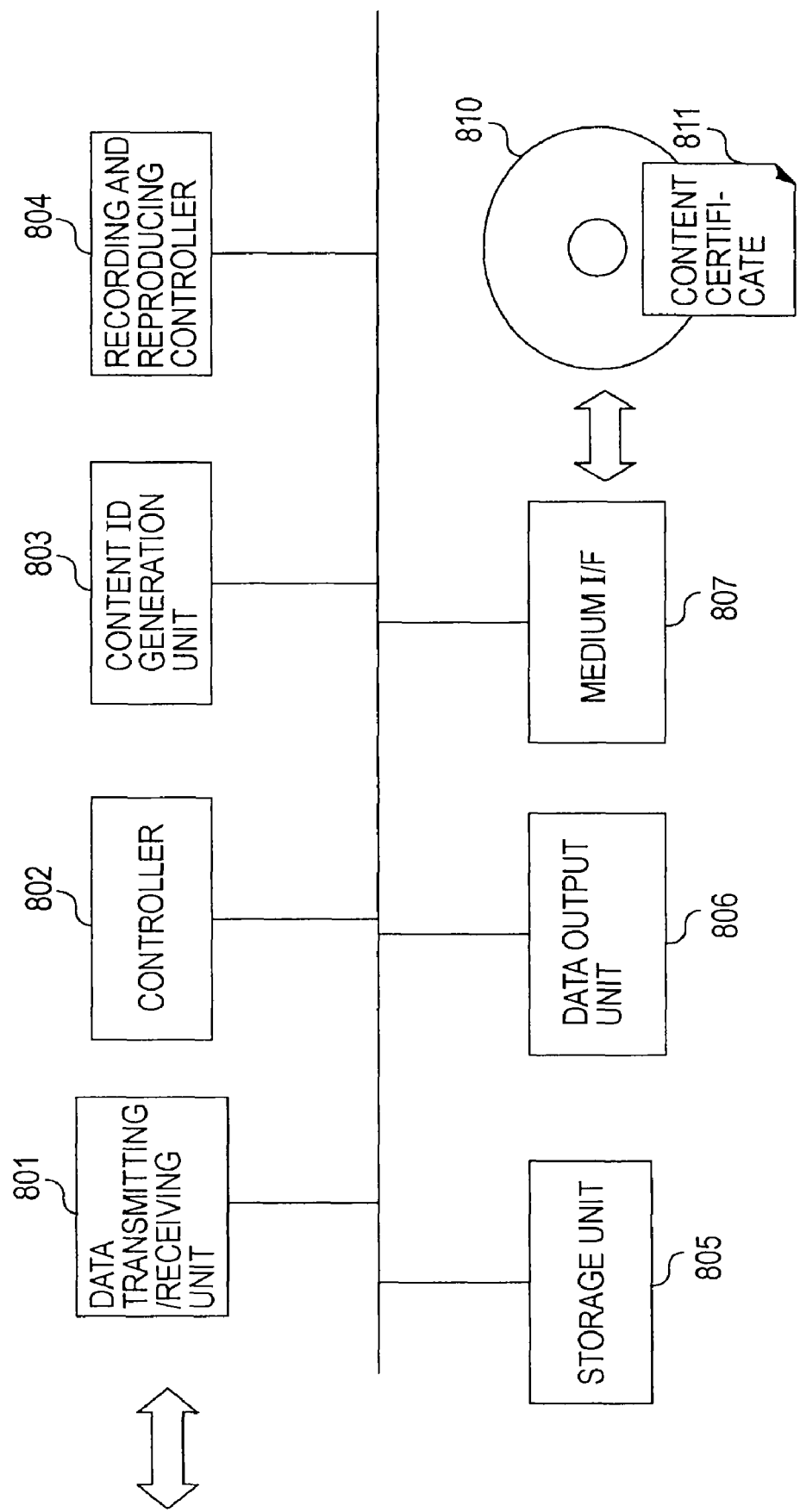

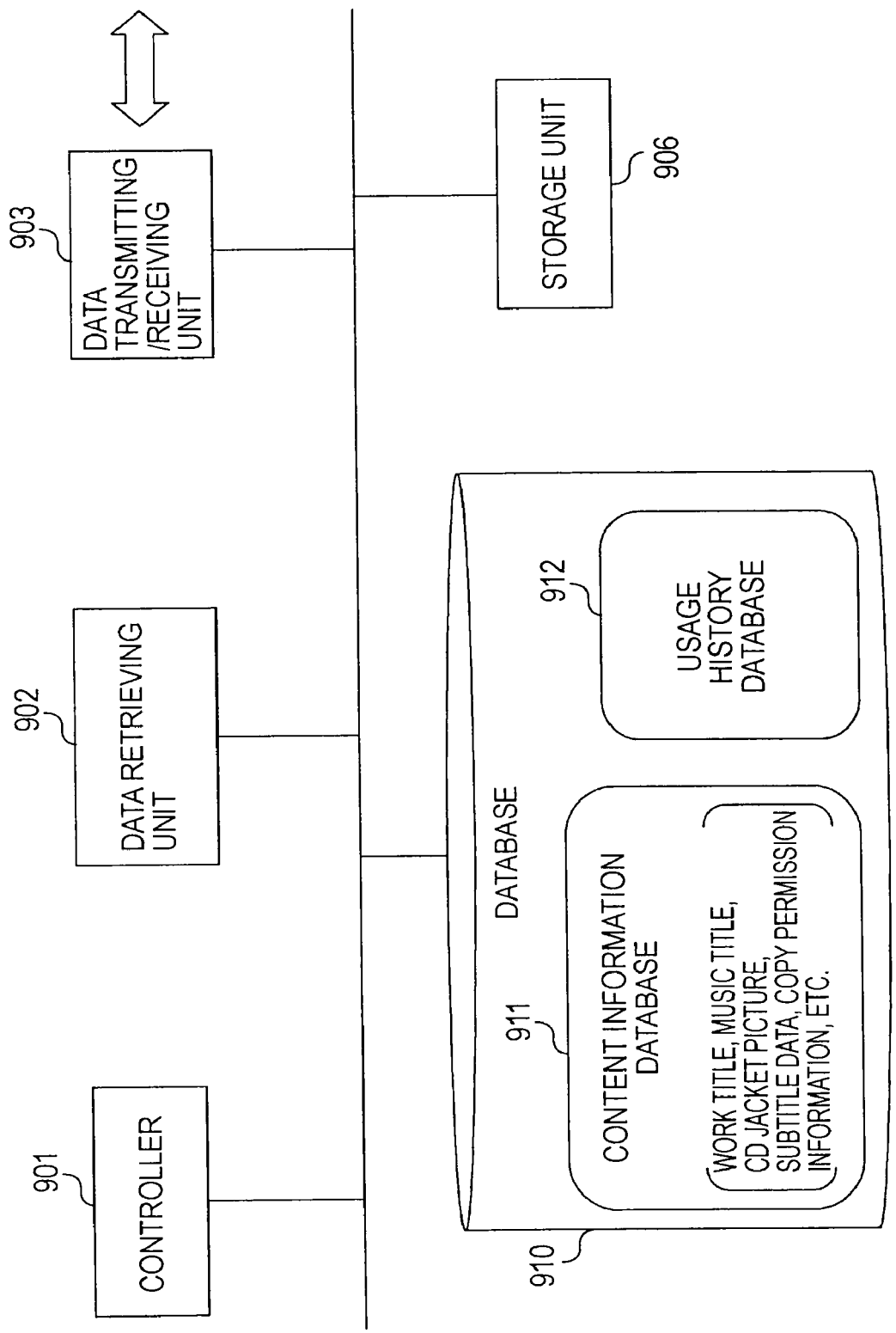

INFORMATION PROCESSING APPARATUS, INFORMATION PROCESSING METHOD AND COMPUTER PROGRAM

CROSS REFERENCES TO RELATED APPLICATIONS

The present invention contains subject matter related to Japanese Patent Application JP 2007-097857 filed in the Japanese Patent Office on Apr. 3, 2007, the entire contents of which are incorporated herein by reference.

BACKGROUND OF THE INVENTION

1. Field of the Invention

The present invention relates to information processing apparatuses, information recording media, information processing methods, and computer programs. Particularly, the present invention relates to an information processing apparatus which performs processing of obtaining content information, such as a music title and a work title, which corresponds to content stored in an information recording medium, and relates to the information recording medium, an information processing method, and a computer program.

2. Description of the Related Art

In recent years, a service for obtaining information on a title of music stored in a CD (Compact Disc), for example, from an external server connected via a network has been utilized. In this service, for example, TOC (table of contents) information, which is so-called content information recorded in advance in a music CD, may be transmitted to a server, and the server may provide for users with content information such as a music title which has been registered in accordance with the TOC. Note that, as the related art, Japanese Patent No. 3104628 discloses a configuration for obtaining content information on the basis of information recorded on a disc.

In recent years, DVDs (Digital Versatile Discs) and BDs (Blu-ray Discs: registered trademark) have been used as recording media for recording content such as music and movies. Such DVDs and BDs can store a large amount of data when compared with CDs. However, in a case where management information such as TOC information stored in a CD is utilized, specific data is not necessarily uniquely specified. Furthermore, although an ISRC (International Standard Recording Code) or a cataloging number of the TOC is used as an identification signal in Japanese Patent No. 3104628, the ISRC and the cataloging number are arbitrarily recorded in a CD, that is, the ISRC and the cataloging number are not necessarily recorded in a CD. The ISRC and the cataloging number are inserted when an authoring process is performed on the CD, and may be mistakenly recorded twice or more at the time of the authoring process.

SUMMARY OF THE INVENTION

To address these problems, it is desirable to provide an information processing apparatus which uniquely and reliably specifies content and which realizes processing of obtaining content information, and to provide an information processing method, and a computer program.

According to an embodiment of the present invention, there is provided an information processing apparatus that obtains pieces of content information relating to content recorded in an information recording medium. The information processing apparatus includes a content identifier generation unit configured to read a content certificate which is recorded in the recording medium and which corresponds to the content stored in the information recording medium, and generate a content identifier by combining hash values which correspond to the content and which are included in data stored in the content certificate, a data transmitting unit configured to transmit the content identifier generated using the content identifier generation unit to a content information provision server, a data receiving unit configured to receive, from the content information provision server, the pieces of content information relating to the content which is specified on the basis of the content identifier, and a data outputting unit configured to output the pieces of content information received using the data receiving unit.

The content certificate may include content hash table digests generated as digest values on the basis of the hash values which are recorded in a content hash table and which are generated on the basis of hash units included as configuration data in the content recorded in the information recording medium. The content identifier generation unit may obtain the content hash table digests recorded in the content certificate and concatenate the obtained content hash table digests to generate the content identifier.

The content certificate may include the content hash table digests generated on a clip-by-clip basis, a clip being a unit of reproduction of the content recorded in the information recording medium. The content identifier generation unit may obtain the content hash table digests on a clip-by-clip basis recorded in the content certificate and concatenate the obtained content hash table digests in clip order so that the content identifier is generated.

The content certificate may be recorded in each of a plurality of recording layers in the information recording medium so that a plurality of content certificates are included in the information recording medium. The content identifier generation unit may obtain content hash table digests recorded in the plurality of content certificates for individual recording layers, and concatenate the obtained content hash table digests in clip order and in layer order to generate the content identifier.

The content identifier generation unit may generate the content identifier by combining the hash values included in the data of the content certificate and a content certificate identifier (CCID) including a combination of the following pieces of data recorded in the content certificate, that is, (a) an applicant identifier which is an identifier used to specify a provider of the content recorded in the information recording medium or a disc manufacturer which is a manufacturer of the information recording medium, and (b) a content sequence number which is an identifier corresponding to the applicant identifier and the content recorded in the information recording medium.

The content identifier generation unit may record the content identifier generated on the basis of the data included in the content certificate recorded in the information recording medium so as to correspond to the content recorded in the information recording medium in a storage unit as history data. The data transmitting unit may transmit the content identifier history data recorded in the storage unit to the content information provision server. The data receiving unit may receive, from the content information provision server, pieces of content information relating to recommendation content specified on the basis of the content identifier history data.

The content certificate may include the content certificate identifier, pieces of data including content hash table digests, and a digital signature assigned thereto, and the content identifier generation unit checks validity of the digital signature recorded in the content certificate so as to check validities of the content certificate and the content, and only when it is determined that the content certificate and the content are valid, that is, the content is not falsified, obtains the data from the content certificate, and generates the content identifier on the basis of the obtained data.

According to another embodiment of the present invention, there is provided an information processing apparatus serving as a server that receives a content identifier from a client apparatus and that provides a client apparatus with pieces of content information relating to the received content identifier. The information processing apparatus includes a data receiving unit configured to receive, from the client apparatus, the content identifier generated using hash values which correspond to content stored in the information recording medium and which are pieces of data recorded in the content certificate which is recorded in the information recording medium loaded in the client apparatus, a database which includes content identifiers and pieces of content information which relate to pieces of content corresponding to the content identifiers, a data retrieving unit configured to obtain the pieces of content information relating to the content which is specified on the basis of the content identifier received using the data receiving unit, and a data transmitting unit configured to transmit the pieces of content information obtained using the data retrieving unit to the client apparatus.

The content certificate may include content hash table digests generated as digest values on the basis of the hash values which are recorded in a content hash table and which are generated on the basis of hash units included as configuration data in the content recorded in the information recording medium. The data receiving unit may receive the content identifier generated by concatenating the content hash table digests. The data retrieving unit may search the database for the pieces of content information relating to the content specified on the basis of the content identifier generated by concatenating the content hash table digests, and obtain the pieces of content information relating to the content specified on the basis of the content identifier from the database.

The content hash table digests may be recorded in the content certificate on a clip-by-clip basis, a clip being a unit of reproduction of content recorded in the information recording medium. The data receiving unit may receive the content identifier generated by concatenating the content hash table digests on a clip-by-clip basis. The data retrieving unit recognizes individual clips included in the content identifier and performs retrieving processing on the database on the basis of results of recognition.

The data receiving unit may receive the content identifier generated using the hash values included in the data of the content certificate and a content certificate identifier (CCID) including a combination of the following pieces of data recorded in the content certificate, that is, (a) an applicant identifier which is an identifier used to specify a provider of the content recorded in the information recording medium or a disc manufacturer which is a manufacturer of the information recording medium, and (b) a content sequence number which is an identifier corresponding to the applicant identifier and the content recorded in the information recording medium.

The information processing apparatus may further includes a usage history database that stores pieces of history data corresponding to content identifiers transmitted from client apparatuses. The data retrieving unit may analyze a user's preference by comparing the content identifier transmitted from the client apparatus with data stored in the usage history database, selects recommendation content in accordance with the user's preference, and obtain pieces of content information relating to the selected recommendation content from the database. The data transmitting unit may transmit the pieces of content information obtained using the data retrieving unit to the client apparatus.

The data retrieving unit may perform processing of selecting the recommendation content which matches the user's preference in accordance with a collaborative filtering algorithm.

According to still another embodiment, there is provided an information processing method for obtaining pieces of content information relating to content recorded in an information recording medium. The information processing method includes the steps of reading a content certificate which is recorded in the recording medium and which corresponds to the content stored in the information recording medium, and generating a content identifier by combining hash values which correspond to the content and which are included in data stored in the content certificate, transmitting the generated content identifier to a content information provision server, receiving, from the content information provision server, the pieces of content information relating to the content which is specified on the basis of the content identifier, and outputting the received pieces of content information.

The content certificate may include content hash table digests generated as digest values on the basis of the hash values which are recorded in a content hash table and which are generated on the basis of hash units included as configuration data in the content recorded in the information recording medium. The content hash table digests recorded in the content certificate may be obtained and concatenated so that the content identifier is generated.

The content certificate may include the content hash table digests generated on a clip-by-clip basis, a clip being a unit of reproduction of the content recorded in the information recording medium. The content hash table digests recorded in the content certificate on a clip-by-clip basis may be obtained and concatenated in clip order so that the content identifier is generated.

The content certificate may be recorded in each of a plurality of recording layers in the information recording medium so that a plurality of content certificates are included in the information recording medium. Content hash table digests recorded in the plurality of content certificates for individual recording layers may be obtained and concatenated in clip order and in layer order so that the content identifier is generated.

The content identifier my be generated by combining the hash values included in the data of the content certificate as data and a content certificate identifier (CCID) including a combination of the following pieces of data recorded in the content certificate, that is, (a) an applicant identifier which is an identifier used to specify a provider of the content recorded in the information recording medium or a disc manufacturer which is a manufacturer of the information recording medium, and (b) a content sequence number which is an identifier corresponding to the applicant identifier and the content recorded in the information recording medium.

The information processing method may further includes the steps of recording the content identifier generated on the basis of the data included in the content certificate recorded in the information recording medium so as to correspond to the content recorded in the information recording medium in a storage unit as history data, transmitting the content identifier history data recorded in the storage unit to the content information provision server, and receiving, from the content information provision server, pieces of content information relating to recommendation content specified on the basis of the content identifier history data.

The content certificate may include the content certificate identifier, pieces of data including content hash table digests, and a digital signature assigned thereto. Validity of the digital signature recorded in the content certificate may be checked so as to check validities of the content certificate and the content, and only when it is determined that the content certificate and the content are valid, that is, the content is not falsified, the data may be obtains from the content certificate and the content identifier may be generated on the basis of the obtained data.

According to a further embodiment of the present invention, there is provided an information processing method of an information processing apparatus serving as a server that receives a content identifier from a client apparatus and that provides a client apparatus with pieces of content information relating to the received content identifier. The information processing method includes the steps of receiving, from the client apparatus, the content identifier generated using hash values which correspond to content stored in the information recording medium and which are pieces of data recorded in the content certificate which is recorded in the information recording medium loaded in the client apparatus, searching a database which includes content identifiers and pieces of content information which relate to pieces of content corresponding to the content identifiers for the pieces of content information relating to the content which is specified on the basis of the received content identifier, and transmitting the obtained pieces of content information to the client apparatus.

The content certificate may include content hash table digests generated as digest values on the basis of the hash values which are recorded in a content hash table and which are generated on the basis of hash units included as configuration data in the content recorded in the information recording medium. The content identifier generated by concatenating the content hash table digests may be received, and the database is searched for the pieces of content information relating to the content specified on the basis of the content identifier generated by concatenating the content hash table digests, and the pieces of content information relating to the content specified on the basis of the content identifier may be obtained from the database.

The content hash table digests may be recorded in the content certificate on a clip-by-clip basis, a clip being a unit of reproduction of content recorded in the information recording medium. The content identifier generated by concatenating the content hash table digests on a clip-by-clip basis may be received, and the content identifier may be recognized as individual clips and retrieving processing may be performed on the database on the basis of results of recognition.

The content identifier generated using the hash values included in the data of the content certificate and a content certificate identifier (CCID) including a combination of the following pieces of data recorded in the content certificate may be received, that is, (a) an applicant identifier which is an identifier used to specify a provider of the content recorded in the information recording medium or a disc manufacturer which is a manufacturer of the information recording medium, and (b) a content sequence number which is an identifier corresponding to the applicant identifier and the content recorded in the information recording medium.

The information processing method may further include the steps of analyzing a user's preference by comparing the content identifier transmitted from the client apparatus with pieces of history data which are included in a usage history database and which correspond to content identifiers transmitted from client apparatuses, selecting recommendation content in accordance with the user's preference, and obtaining pieces of content information relating to the selected recommendation content from the database, and transmitting the obtained pieces of content information to the client apparatus.

Processing of selecting the recommendation content in accordance with the user's preference may be performed in accordance with a collaborative filtering algorithm.

According to a still further embodiment of the present invention, there is provided a computer program that causes an information processing apparatus to perform processing of obtaining pieces of content information relating to content recorded in an information recording medium. The computer program includes the steps of reading a content certificate which is recorded in the recording medium and which corresponds to the content stored in the information recording medium, and generating a content identifier by combining hash values which correspond to the content and which are included in data stored in the content certificate, transmitting the generated content identifier to a content information provision server, receiving, from the content information provision server, the pieces of content information relating to the content which is specified on the basis of the content identifier, and outputting the received pieces of content information.

According to a further embodiment of the present invention, there is provided a computer program that causes an information processing apparatus serving as a server that receives a content identifier from a client apparatus and that provides a client apparatus with pieces of content information relating to the received content identifier to perform information processing. The computer program includes the steps of receiving, from the client apparatus, the content identifier generated using hash values which correspond to content stored in the information recording medium and which are pieces of data recorded in the content certificate which is recorded in the information recording medium loaded in the client apparatus, searching a database which includes content identifiers and pieces of content information which relate to pieces of content corresponding to the content identifiers for the pieces of content information relating to the content which is specified on the basis of the received content identifier, and transmitting the obtained pieces of content information to the client apparatus.

Note that the computer program according to the present invention is a computer readable program which is provided for, for example, a computer system capable of executing various program codes, using a recording medium or a communication medium. Since the computer program is a computer readable program, processing is performed in the computer system on the basis of the program.

Other features and advantages of the present invention will become apparent in the following detailed written description and the accompanying drawings. Note that the "system" described herein means a configuration in which a plurality of apparatuses are logical integrated, and is not limited to a configuration in which a plurality of apparatuses having own configurations are stored in one case.

Accordingly, in this configuration, hash values, i.e., content hash table digests are obtained from a content certificate corresponding to content recorded in an information recording medium, a content identifier is generated on the basis of the content hash table digests, and the generated content identifier is transmitted to a server. Furthermore, the server specifies the content in accordance with the received content identifier, obtains pieces of content information relating to the content, such as a music title, a work title, and a CD jacket picture, and provides an information processing apparatus with the pieces of content information. With this configuration, the content is uniquely specified and a configuration for performing service provision processing which functions as content information obtaining processing is realized.

BRIEF DESCRIPTION OF THE DRAWINGS

FIG. 4 is a diagram illustrating configurations of the content certificate and a content hash table;

FIG. 5 is a diagram illustrating an example of a data configuration of the content certificate;

FIG. 6 is a diagram illustrating an example of directory configuration of the pieces of data stored in an information recording medium;

FIG. 15 is a diagram illustrating an example of a configuration of a usage history database;

FIG. 16 is a diagram illustrating a collaborative filtering algorithm;

FIG. 17 is a diagram illustrating a configuration and a function of a client apparatus which performs the processing of obtaining pieces of content information on the basis of a content identifier; and FIG. 18 is a diagram illustrating a configuration and a function of a server which performs the processing of providing the pieces of content information on the basis of the content identifier.

DESCRIPTION OF THE PREFERRED EMBODIMENTS

An information processing apparatus, an information processing method, and a computer program according to the present invention will be described in detail hereinafter with reference to the accompanying drawings. Note that the description is made in the following order.

1. An outline of an example of a system configuration to which the present invention is applied 2. Pieces of data stored in an information recording medium 3. An example of processing of obtaining content information using hash values 4. An example of processing of obtaining content information using hash values and a content certificate identifier (CCID)

Figure 1:
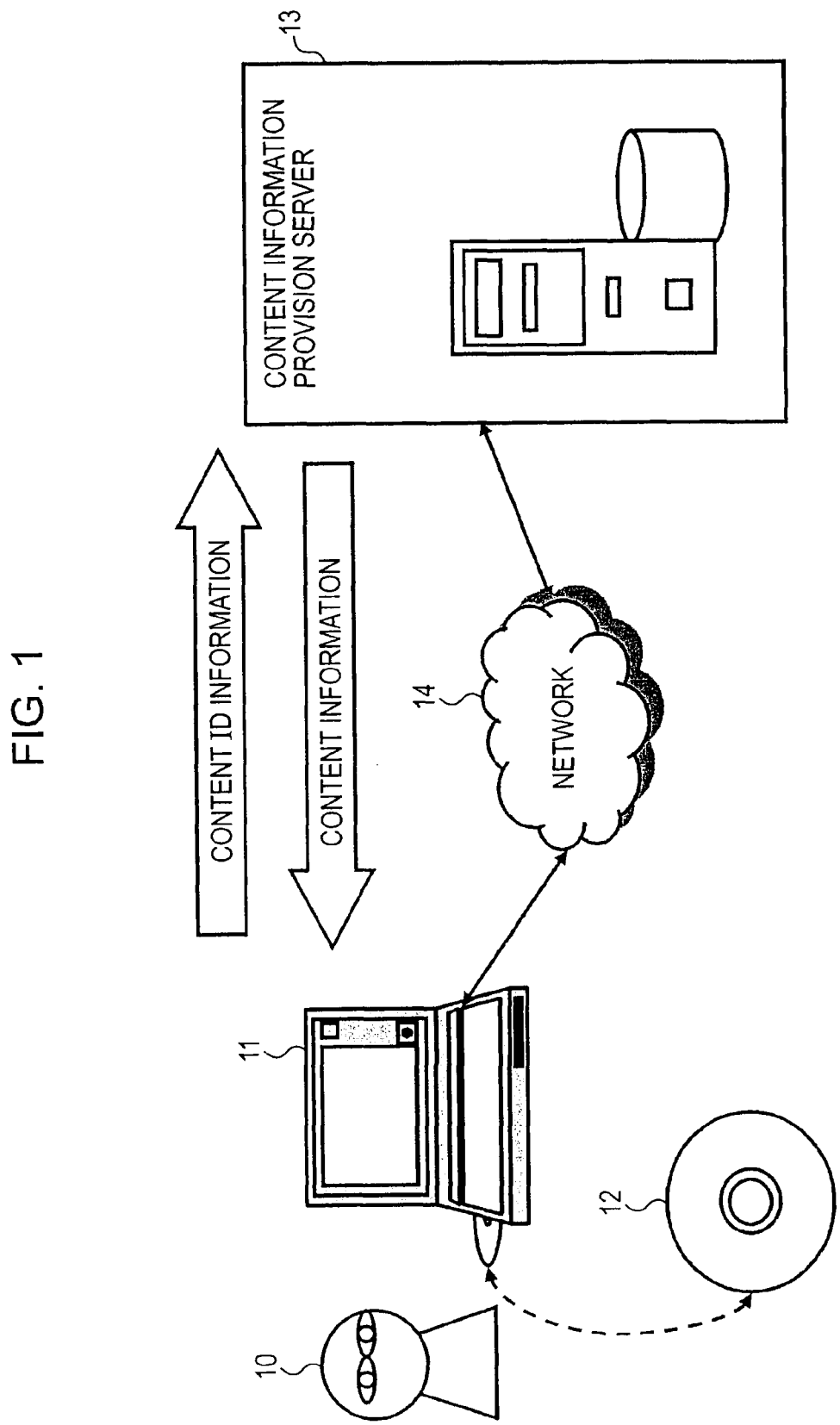
FIG. 1 is a diagram illustrating an example of a system to which the present invention is applied.

5. Recommendation content information provision processing on the basis of a user's preference 6. A configuration of an information processing apparatus 1. An Outline of an Example of a System Configuration to which the Present Invention is Applied Referring to FIG. 1, an outline of an example of a system configuration to which the present invention is applicable will now be described. FIG. 1 shows an information processing apparatus 11 as a reproducing apparatus which performs information reproduction from an information recording medium used by a user 10. The information processing apparatus 11 is used as a reproducing apparatus which performs information reproduction from an information recording medium 12 such as a DVD (Digital Versatile Disc) or a BD (Blu-ray Disc: registered trademark).

The information recording medium 12 stores content such as music or a movie therein. A user 10 inserts the information recording medium 12 into the information processing apparatus 11 so that the content is reproduced. When the user 10 tries to obtain various pieces of content information stored in the information recording medium 12, the user uses the information processing apparatus 11 to transmit specific content identification information through a network 14 to a content information provision server 13. Examples of the various pieces of content information include, in the case of a piece of music, a music title, an artist name, and a picture image of a CD jacket, and in the case of a movie, a title of a movie, a director's name, actors' names, and a picture image of a poster.

The content information provision server 13 includes a database which stores various pieces of content information relating to content therein. In accordance with the content identification information transmitted from the information processing apparatus 11, the content information provision server 13 obtains pieces of content information (such as a music title and a work title) corresponding to content from the database, and the obtained pieces of content information are transmitted to the information processing apparatus 11. The information processing apparatus 11 displays the pieces of content information transmitted from the content information provision server 13 on a display unit. The user 10 views the pieces of content information relating to the content displayed on the display unit, and confirms the pieces of content information relating to the content stored in the information recording medium 12 which is loaded in the information processing apparatus 11.

As described above, in a case where a system in which a user transmits content identification information and obtains pieces of content information from a server is employed for a CD, TOC (Table of Contents) information recorded in the CD is transmitted to the server, and the server obtains pieces of content information corresponding to the TOC information and provides the user with the obtained pieces of content information. However, since the TOC information is not necessarily unique, it is possible that identical pieces of TOC information corresponding to different pieces of content information exist in a database. In this case, the user may not obtain the pieces of content information relating to the content.

The present invention realizes a configuration capable of obtaining pieces of content information from the server by utilizing content hash table digests which are pieces of data included in the content certificate (CC) recorded in the information recording medium.

The content hash table digests are generated on the basis of content hash values generated in accordance with configuration data of the content recorded in the information recording medium. An embodiment employing a BD (Blu-ray Disc: registered trademark) as the information recording medium will be described hereinafter. A content certificate issued in accordance with an AACS (Advanced Access Content System), which is a content management system, is stored in the BD in which the content is recorded, and processing of obtaining the pieces of content information is performed using the content hash table digests included in the content certificate. Note that the recording medium used in this embodiment is not limited to a BD, and any information recording medium may be employed as long as the information recording medium has a configuration in which a content certificate corresponding to content stored in the information recording medium is recorded in the information recording program.

2. Pieces of Data Stored in an Information Recording Medium

Figure 2:
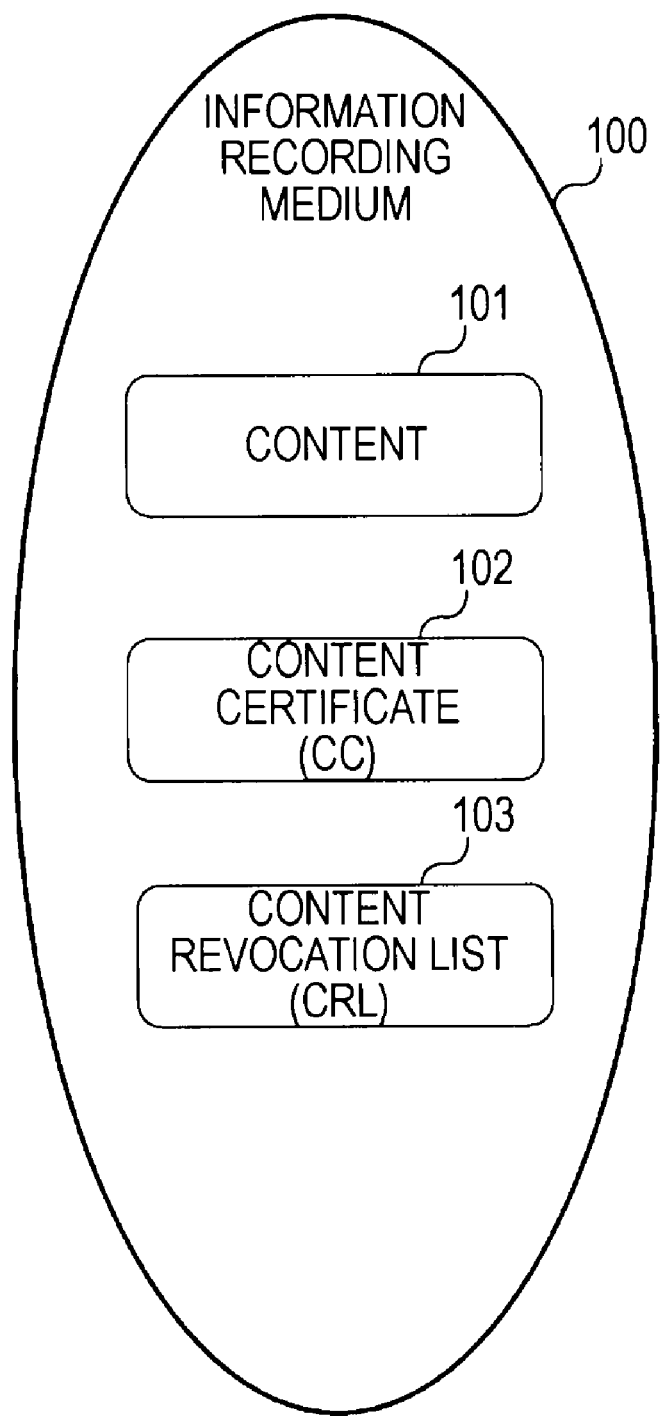
FIG. 2 is a diagram illustrating a configuration of an information recording medium storing pieces of data therein.

FIG. 2 shows pieces of data stored in an information recording medium 100. The information recording medium 100 includes content 101, a content certificate 102, and a content revocation list (CRL) 103. Note that although not shown in FIG. 2, pieces of data other than these pieces of data, such as management information corresponding to the content 101, use-control information, and information relating to decryption of encrypted content, are also stored in the information recording medium 100.

The content 101 represents a piece of music or a movie, for example. The content 101 may be a plurality of pieces of content 101. The content certificate 102 corresponds to the content 101 recorded in the information recording medium 100 and proves that the content 101 is valid content which is approved by the management system (such as the AACS). A digital signature generated in accordance with the management system (such as the AACS) is attached to the content certificate 102 so that validity of the content certificate 102 is checked.

The content revocation list (CRL) 103 is used to detect illegal content. That is, the content revocation list (CRL) 103 is a list of pieces of illegally copied content, for example, which have been illegally distributed. In a case where the content 101 included in the information recording medium 100 is reproduced, the information processing apparatus (reproducing apparatus) 11 refers to the content revocation list (CRL) 103 before executing a content reproducing application. When it is determined that an ID of the content 101 included in the information recording medium 100 does not coincide with any of IDs of the pieces of content included in the content revocation list (CRL) 103, the reproduction of the content 101 is permitted.

Figure 3:
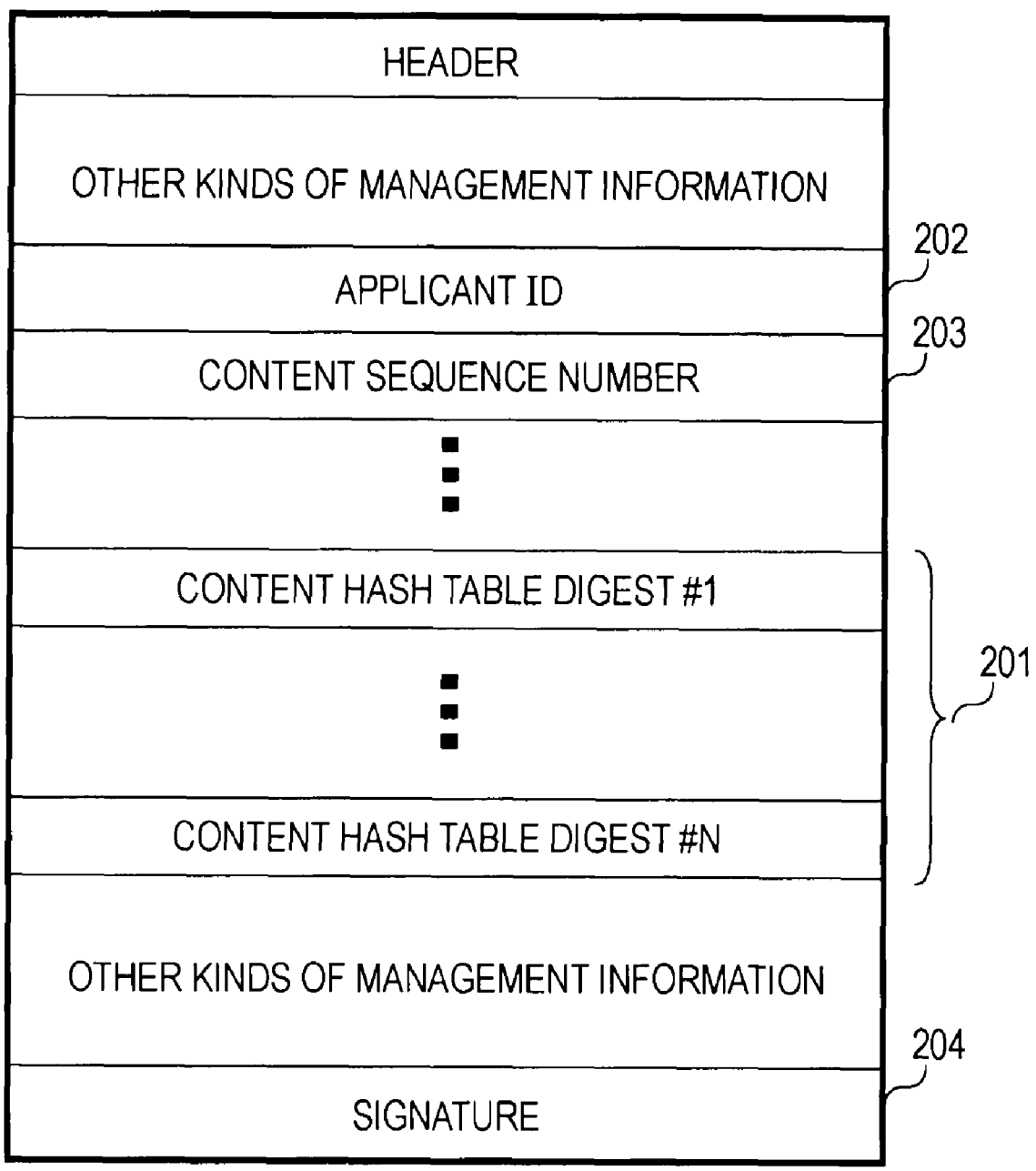
FIG. 3 is a diagram illustrating an example of a data configuration of a content certificate.

Referring to FIG. 3 and subsequent drawings, a configuration of the content certificate 102 will be described. FIG. 3 is a diagram schematically illustrating a data configuration of the content certificate (CC) 102 prescribed by AACS. The content certificate 102 includes various pieces of management data used to prove validity of the content recorded in the information recording medium.

The content certificate 102 includes, for example, content hash table digests 201 which are used to check whether the content 101 recorded in the information recording medium 100 is valid. In addition, the content certificate 102 includes an applicant ID 202 which serves as an identifier used to specify a provider of the content recorded in the information recording medium or specify a disc manufacturer which is a manufacturer of the information recording medium, and further includes a content sequence number 203 which serves as an identifier corresponding to the content recorded in the recording medium. Furthermore, a digital signature 204 generated in accordance with the content management system (AACS, for example) is attached to the content certificate 102.

The content hash table digests registered in the content certificate 102 will be further described with reference to FIG. 4. In FIG. 4, (a) shows a configuration of the content certificate 102 in which a header, and a plurality of content hash table digests (#0) to (#N) are registered, and a digital signature is assigned to the content certificate 102.

The content hash table digests (#0) to (#N) denote digest values of hash units which are registered in a content hash table shown in (b) of FIG. 4. The content hash table corresponds to content recorded in the information recording medium. For example, a content hash table is provided for a CPS unit which is provided for content or a content portion. Note that in a case where a recording media having two recording layers is employed, content hash tables are provided for individual layers and content certificates are also provided for individual layers. This configuration will be described later with reference to FIG. 7.

The content hashes are hash values generated in accordance with corresponding hash units (192 KB, for example) which are selected from a plurality of data portions included in the content shown in (c) of FIG. 4. For example, content data shown in (c) of FIG. 4 corresponds to a clip (clip AV stream) which is a unit of content reproduction. As shown in (c) of FIG. 4, some of the plurality of data portions in the clip are selected as the hash units. The hash values generated by calculation performed in accordance with pieces of data included in the hash units are registered in the content hash table. Note that SHA-1 is used for hash value calculation processing, for example.

Furthermore, hash values are newly calculated in accordance with pieces of data corresponding to the hash values registered in the content hash table. The newly calculated hash values are registered as content hash table digests in the content certificate 102 shown in (a) of FIG. 4. That is, different content hash table digests, i.e., hash values, are provided for different clips each of which is a unit of reproduction of content recorded in the information recording medium.

The content hash table shown in (b) of FIG. 4 is used for, for example, falsification detection processing performed on content before the content is reproduced. For example, the hash units are extracted from the content to be reproduced, and hash values are calculated from the hash units in accordance with a predetermined algorithm for calculating hash values. The calculated hash values are compared with the content hashes registered in the content hash table. In accordance with the results of the comparison, it is determined whether the content is valid.

The content certificate 102 includes the content hash table digests which are used to detect falsification of the content hash table which is, in turn, used to detect falsification of the content as described above, and the applicant ID 202 serving as an identifier used to specify a provider of the content recorded in the information recording medium or specify a disc manufacturer which is a manufacturer of the information recording medium as described above. The content certificate 102 further includes a content sequence number 203 serving as an identifier which corresponds to the content recorded in the information recording medium and which corresponds to the application ID. An entire data configuration of the content certificate 102 is shown in FIG. 5.

Pieces of data included in the content certificate 102 will be described. The content certificate 102 includes the following pieces of data.
(a) Certificate Type: data indicating a kind of digital certificate
(b) Total_Number_of_HashUnits: the total number of hash units generated on the basis of the content
(c) Total_Number_of_Layers: the total number of layers of the information recording medium
(d) Layer_Number: a layer number corresponding to the content certificate
(e) Number_of_HashUnits: the number of hash units in the layers corresponding to the content
(f) Number_of_Digests: the number of Clip AV streams in the layers
(g) Applicant ID: an identifier (ID) uniquely assigned to individual licensed content providers or individual disc manufacturers
(h) Content Sequence Number: content identifier (ID) uniquely assigned to individual pieces of content by licensed content providers or disc manufacturers
(i) Minimum CRL Version: an earliest version of CRL (content revocation list) which can be referenced
(j) Length_Format_Specific_Section: the number of bytes of data having a specific format (the content certificate can be used in different formats)
(k) Hash_Value_of_MC_Manifest_File: a hash value used to detect falsification of a "Managed Copy Manifest File"
(l) Hash_Value_of_BDJ_Root_Cert: a hash value used to detect falsification of a "BD-J Root Certificate"
(m) Num_of_CPS_Unit: the number of the CPS units set in the content recorded in the information recording medium
(n) Hash_Value_of_CPS_Unit_Usage_File: a hash value of a CPU-unit-usage-control-information file
(o) Content Hash Table Digest: a hash value of a portion corresponding to one of clip AV streams in the content hash table
(p) Signature Data: a digital signature generated in accordance with a management system (AACS, for example) for the content certificate The pieces of data listed above are merely examples and are stored in the content certificate. The content certificate is stored, in accordance with the management system (AACS), in the BD in which the corresponding content is stored. Among the pieces of data listed above,
(g) Applicant ID
(h) Content Sequence Number
(i) Minimum CRL Version
(p) Signature Data
are generated in accordance with the management system (AACS). The other pieces of data may be generated by the content providers or the disc manufacturers.

Each of the content hash table digests 201 described with reference to FIGS. 3 and 4 corresponds to the "(o) Content Hash Table Digest."

Furthermore, the applicant ID 202, which serves as an identifier used to specify a provider of the content recorded in the information recording medium or specify a disc manufacturer which is a manufacturer of the information recording medium as described with reference to FIG. 3, corresponds to "(g) Applicant ID" shown in FIG. 5. Moreover, the content sequence number 203, which serves as an identifier corresponding to the content recorded in the information recording medium, corresponds to "(h) Content Sequence Number" shown in FIG. 5.

Since the content certificate includes digest values generated in accordance with the content hash table used to check the validity of the content, and receives the signature assigned by the management system before being issued, data included in the content certificate cannot be changed. Furthermore, the content certificate ID is assigned in accordance with the management system to data which is unique to the content and which has digest values of the content hash table corresponding to the content. Accordingly, content certificates having identical content certificate IDs correspond to common content (content hash table).

In addition to the content, pieces of management information such as the content certificate described above are included in the information recording medium. FIG. 6 shows an example of a directory configuration of the pieces of data stored in the information recording medium. The directories shown in FIG. 6 are configured in accordance with the Blu-ray Disc (registered trademark) format. The configuration includes an AACS directory 251 which is used to record pieces of content management data therein, and a BDMV directory 252 which is used to record pieces of content data therein. Specifically, the AACS directory 251 includes therein management information files such as the content certificate and the content hash table, and the BDMV directory 252 includes therein, in addition to the clip AV streams as entities of the pieces of content data, pieces of data such as a work title, an object, a playlist, clip information, and data files thereof, which are not shown.

The clip AV streams, which are entities of the pieces of content data, correspond to clips each of which is a unit of content reproduction. When one of the clips is selected, reproduction is performed on a clip-by-clip basis. The hash values included in the content hash table described above and the content hash table digests recorded in the content certificate are managed by the corresponding clips each of which is a unit of content reproduction. A management configuration for each clip will be described with reference to FIG. 7.

Figure 7:
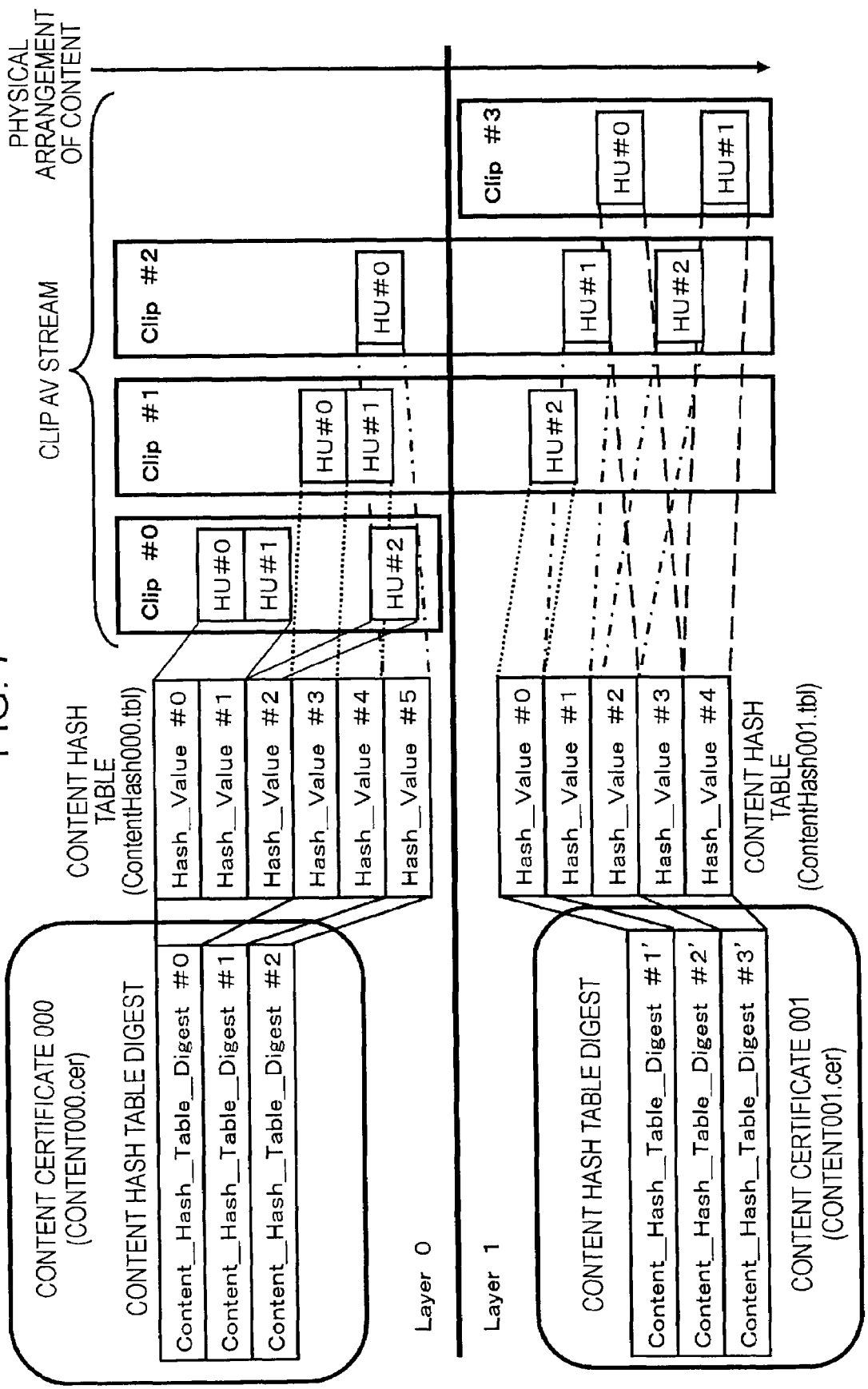
FIG. 7 is a diagram illustrating the relationships between content certificates and the pieces of data, that is, clips, content hash tables, and content hash table digests which are stored in an information recording medium.

FIG. 7 shows four clips (clip AV streams) each of which is a unit of content reproduction. Specifically, a clip #0, a clip #1, a clip #2, and a clip #3 are recorded in the information recording medium.

Each of the clips includes hash units (HUs) as pieces of configuration data.

A configuration shown in FIG. 7 includes an upper layer ("layer 0") and a lower layer ("layer 1") which are different from each other in a disc. The clip #0 constituting a unit of content reproduction is recorded only in the layer 0. The clips #1 and #2 are recorded in both of the layer 0 and the layer 1. The clip #3 is recorded only in the layer 1.

Content hash tables and content certificates including the corresponding content hash tables are provided for individual layers. The content hash tables and the content certificates provided for individual layers are stored in the AACS directory 251 shown in FIG. 6 as individual files. For example, a content certificate 000 (Content000.cer) shown in FIG. 6 corresponds to a content certificate file for the layer 0, a content certificate 001 (Content001.cer) shown in FIG. 6 corresponds to a content certificate file for the layer 1, a content hash table 000 (ContentHash000.tbl) shown in FIG. 6 corresponds to a content hash table for the layer 0, and a content hash table 001 (ContentHash001.tbl) shown in FIG. 6 corresponds to a hash table for the layer 1.

The clip #0 includes three hash units (HU #0 to HU #2) as shown in FIG. 7, and each of the hash units has a size of 192 KB. Hash values are calculated for the individual hash units and are recorded in the content hash table in the layer 0. For example, SHA-1 is employed as an algorithm of the hash value calculation.

Specifically, data "Hash_Value #0" recorded in the content hash table "ContentHash000.tbl" included in the layer 0 corresponds to a hash value calculated on the basis of the hash unit (HU #0) included in the clip #0. Data "Hash_Value #1" corresponds to a hash value calculated on the basis of the hash unit (HU #1) included in the clip #0. Data "Hash_Value #2" corresponds to a hash value calculated on the basis of the hash unit (HU #2) included in the clip #0.

Furthermore, the clip #1 recorded in the layer 0 and the layer 1 includes three hash units (HU #0 to HU #2). Hash values are calculated for the individual hash units and are recorded in the content hash tables in the layer 0 and the layer 1.

Specifically, data "Hash_Value #3" recorded in the content hash table "ContentHash000.tbl" included in the layer 0 corresponds to a hash value calculated on the basis of the hash unit (HU #0) included in the clip #1. Data "Hash_Value #4" corresponds to a hash value calculated on the basis of the hash unit (HU #1) included in the clip #1. The hash unit (HU #2) of the clip #1 is included in the layer 1, and therefore, a hash value for the hash unit (HU #2) is recorded as data "Hash_Value #0" in the content hash table "ContentHash001.tbl" included in the layer 1.

Furthermore, the clip #2 recorded in the layer 0 and the layer 1 includes three hash units (HU #0 to HU #2). Hash values are calculated for the individual hash units and are recorded in the content hash tables in the layer 0 and the layer 1.

Specifically, data "Hash_Value #5" recorded in the content hash table "ContentHash000.tbl" included in the layer 0 corresponds to a hash value calculated on the basis of the hash unit (HU #0) included in the clip #2. Data "Hash_Value #1" recorded in the content hash table "ContentHash001.tbl" included in the layer 1 corresponds to a hash value calculated on the basis of the hash unit (HU #1) included in the clip #2. Data "Hash_Value #2" recorded in the content hash table "ContentHash001.tbl" included in the layer 1 corresponds to a hash value calculated on the basis of the hash unit (HU #2) included in the clip #2.

Furthermore, the clip #3 recorded only in the layer 1 includes two hash units (HU #0 and HU #1). Hash values are calculated for the individual hash units and are recorded in the content hash table in the layer 1.

Specifically, data "Hash_Value #3" recorded in the content hash table "ContentHash001.tbl" included in the layer 1 corresponds to a hash value calculated on the basis of the hash unit "HU #0" included in the clip #3. Data "Hash_Value #4" recorded in the content hash table "ContentHash001.tbl" included in the layer 1 corresponds to a hash value calculated on the basis of the hash unit (HU #1) included in the clip #3.

As described above, the content certificates are provided for individual layers as files. Digest values calculated in accordance with data recorded in the content hash table "ContentHash000.tbl" corresponding to the layer 0 are recorded in the content certificate "Content000.cer" corresponding to the layer 0.

For example, as shown in FIG. 7, three content hash table digests are recorded in the content certificate "Content000.cer" corresponding to the layer 0, i.e., a content hash table digest #0 corresponding to the clip #0, a content hash table digest #1 corresponding to the clip #1, and a content hash table digest #2 corresponding to the clip #2.

The content hash table digest #0 corresponding to the clip #0 is a digest value generated on the basis of the three content hash values "Hash_Value #0" to "Hash_Value #2" corresponding to the hash units "HU #0" to "HU #2" included in the clip #0 in the layer 0. Specifically, a hash value obtained by SHA-1 using the three content hash values "Hash_Value #0" to "Hash_Value #2" is recorded as the content hash table digest #0 in the content certificate "Content000.cer", for example.

The content hash table digest #1 recorded in the content certificate "Content000.cer" for the layer 0 is a digest value generated on the basis of the two content hash values "Hash_Value #3" and "Hash_Value #4" corresponding to the hash units "HU #0" to "HU #1" included in the clip #1 in the layer 0.

The content hash table digest #2 recorded in the content certificate "Content000.cer" for the layer 0 is a digest value generated on the basis of the content hash value "Hash_Value #5" corresponding to the hash unit "HU #0" included in the clip #2 in the layer 0.

On the other hand, in the content certificate "Content001.cer" for the layer 1, digest values generated on the basis of information registered in the content hash table for the layer 1 are registered. A content hash table digest #1' is a digest value generated on the basis of the content hash value "Hash_Value #0" which is recorded in the content hash table "ContentHash001.tbl" for the layer 1 and which corresponds to the hash unit "HU #2" of the clip #1 in the layer 1, and is recorded in the content certificate "Content001.cer" for the layer 1.

A content hash table digest #2' is a digest value generated on the basis of the two content hash values "Hash_Value #1" and "Hash_Value #2" which are recorded in the content hash table "ContentHash001.tbl" for the layer 1 and which correspond to the hash units "HU #1" and "HU #2", respectively, of the clip #2 in the layer 1, and is recorded in the content certificate "Content001.cer" for the layer 1.

A content hash table digest #3' is a digest value generated on the basis of the two content hash values "Hash_Value #3" and "Hash_Value #4" which are recorded in the content hash table "ContentHash001.tbl" for the layer 1 and which correspond to the hash units "HU #0" and "HU #1", respectively, of the clip #3 in the layer 1, and is recorded in the content certificate "Content001.cer" for the layer 1.

As described above, each of the content hash table digests recorded in the content certificates for the individual layers is generated from a corresponding one of the clips included in the corresponding layers. When a clip is recorded in a plurality of layers, content hash table digests generated from an identical clip are stored in corresponding content certificates provided for individual layers. The content hash table digests are unique values generated so as to correspond to the clips each of which is a unit of content reproduction.

3. An Example of Processing of Obtaining Content Information Using Hash Values

Figure 8:
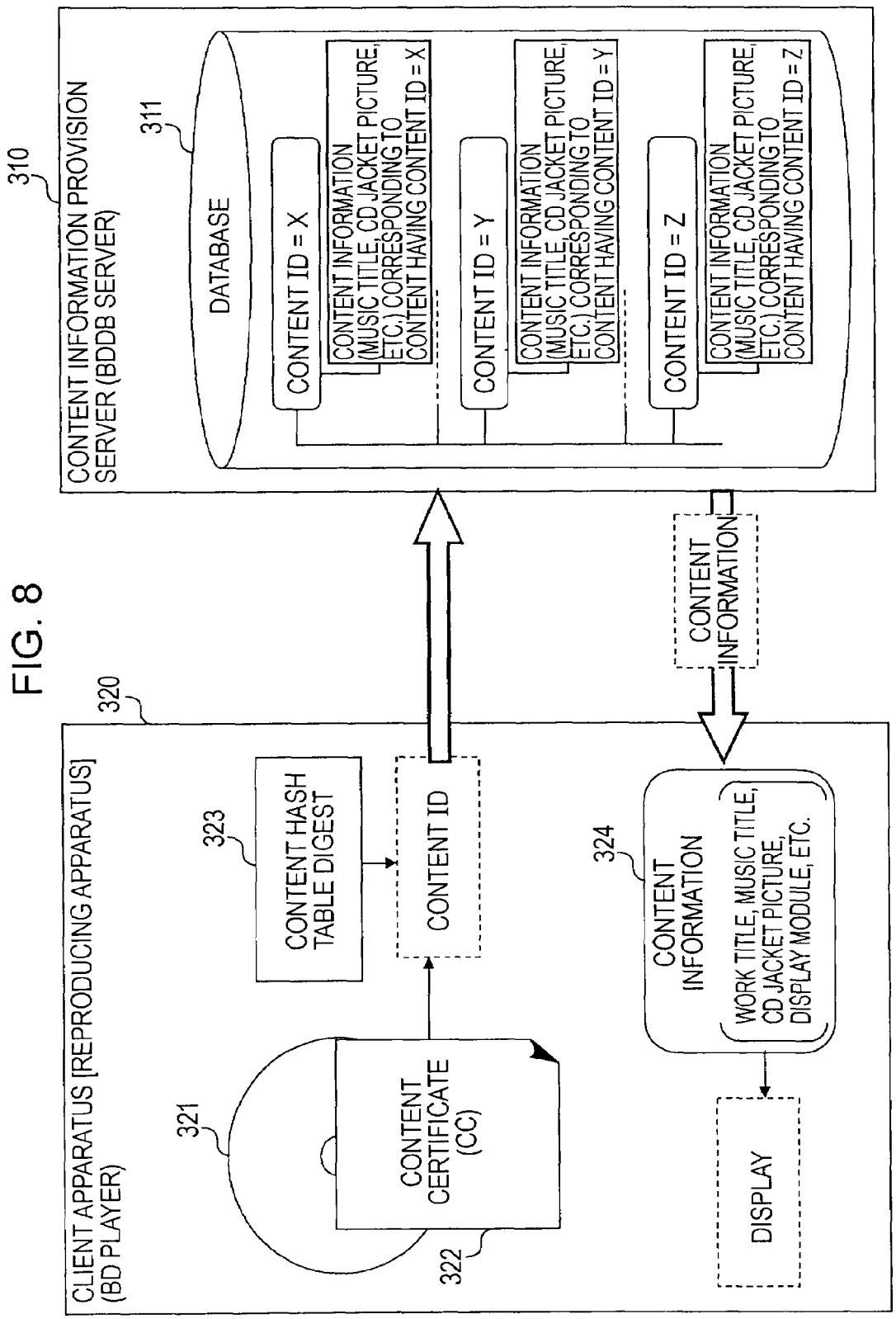
FIG. 8 is a diagram illustrating a sequence of processing steps of obtaining the pieces of content information on the basis of the content identifier.

Referring to FIG. 8, processing of obtaining pieces of content information by utilizing hash values will be described. FIG. 8 shows a content information provision server (BDDB: BD Data Base) 310 and a reproducing apparatus 320 (a BD player, for example) serving as a client apparatus, that is, a user device, used to reproduce content recorded in an information recording medium and obtain pieces of content information such as a music title, a work title, a jacket picture, a performer, a director, a release year, a genre, and cover art which correspond to content recorded in the information recording medium, from the content information provision server 310.

When obtaining the pieces of content information such as a music title and a work name from the content information provision server (BDDB) 310, the client apparatus (reproducing apparatus) 320 reads a content certificate (CC) 322 recorded in an information recording medium 321, obtains content hash table digests recorded in the content certificate (CC) 322, and generates a unique value (content ID) corresponding to the content from which the content hash table digests are generated in accordance with the obtained content hash table digests.

As described above, the content hash table digests are unique values generated so as to correspond to clips each of which is a unit of content reproduction. Accordingly, for example, a value generated by connecting one or more content hash table digests included in content is usable as a unique ID, that is, a content ID which is used to distinguish the content.

The client apparatus (reproducing apparatus) 320 generates a content ID on the basis of content hash table digests 323 obtained from the content certificate (CC) 322 and transmits the generated content ID to the content information provision server 310. For example, it is assumed that three content hash table digests, that is, a content hash table digest denoted by data "aaaa", a content hash table digest #1 denoted by data "bbbb", and a content hash table digest #2 denoted by data "cccc" are registered in the content certificate (CC) 322, the three content hash table digests are concatenated to generate a content ID "X=aaaabbbbcccc". The content ID "X=aaaabbbbcccc" is transmitted to the content information provision server 310.

The content information provision server (BDDB) 310 includes a database 311 which stores pieces of content information therein. The database 311 includes various pieces of content information, such as a music title, a work title, and a CD jacket picture, which relate to the content and which are specified by a content ID. The pieces of content information are obtained from the database 311 on the basis of the content ID transmitted from the client apparatus 320. The obtained pieces of content information are transmitted to the client apparatus (reproducing apparatus) 320.

The client apparatus (reproducing apparatus) 320 receives pieces of content information 324 from the content information provision server (BDDB) 310, and displays the received pieces of content information 324, such as a director's name, an actors' name, a genre, a music title, a work title, and a CD jacket picture on a display unit of the client apparatus (reproducing apparatus) 320.

As described above, the content certificate (CC) corresponding to the content is recorded in the information recording medium 321. The content hash table digests included in the content certificate are unique identifiers used to specify the corresponding clips each of which is a unit of content reproduction. The client apparatus (reproducing apparatus) 320 generates the content ID on the basis of the content hash table digests and obtains the pieces of content information corresponding to the content on the basis of the content ID.

Note that, as shown in FIG. 7, in a case where a disc having a plurality of recording layers is employed, a plurality of content certificates are recorded so as to correspond to the layers, and values of content hash table digests are recorded in the plurality of content certificates. When the values of content hash table digests are thus recorded in the plurality of content certificates, the client apparatus extracts the content hash table digests from the content certificates and the extracted content hash table digests are concatenated to generate a content ID as a unique ID. The generated content ID is transmitted to the content information provision server (BDDB).

Figure 9:
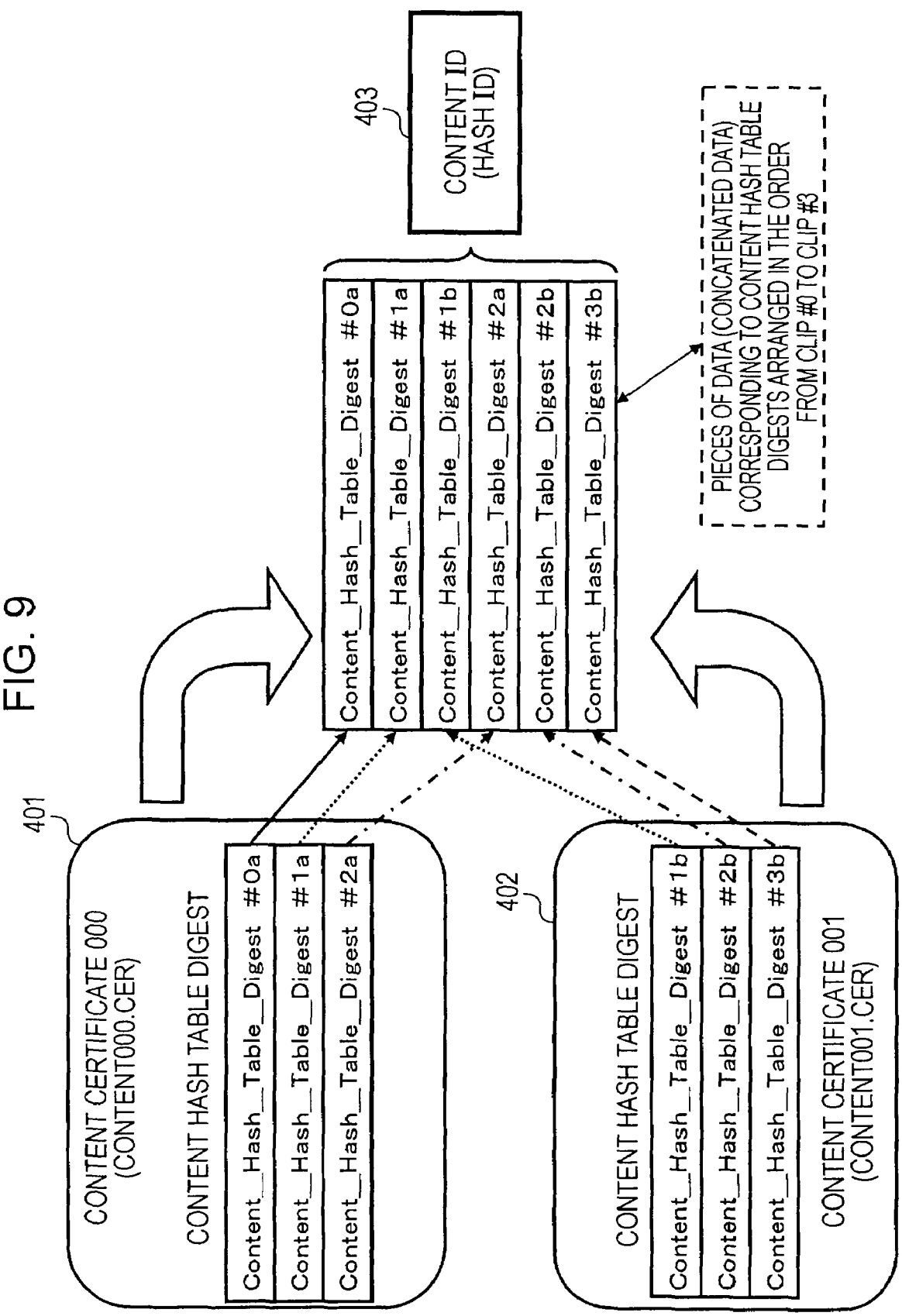
FIG. 9 is a diagram illustrating an example of processing of generating a content identifier on the basis of content hash table digests recorded in content certificates included in different layers.

Processing of generating a content ID by concatenating content hash table digests recorded in a plurality of content certificates in a scattered manner will be described with reference to FIG. 9. In FIG. 9, content hash table digests #0a to #2a recorded in a content certificate 401 for a layer 0 and content hash table digests #1b to #3b recorded in a content certificate 402 for a layer 1 are shown.

Note that the content hash table digest #0a is generated on the basis of a hash unit included in a clip #0, the content hash table digests #1a and #1b are generated on the basis of hash units included in a clip #1, the content hash table digests #2a and #2b are generated on the basis of hash units included in a clip #2, and the content hash table digest #3b is generated on the basis of a hash unit included in a clip #3.

The three content hash table digests #0a to #2a are thus recorded in the content certificate 401 for the layer 0, and the three content hash table digests #1b to #3b are recorded in the content certificate 402 for the layer 1. These content hash table digests are arranged in clip order and in layer order and are concatenated using the client apparatus. Specifically, when it is assumed that a "content hash table digest #n" is denoted by "CHTD #n", the content hash table digests are arranged in the following order: "CHTD #0a", "CHTD #1a", "CHTD #1b", "CHTD #2a", "CHTD #2b", "CHTD #3a". The six content hash table digests are thus arranged in clip order and in layer order so that a content ID (hash ID) 403 is generated. The client apparatus transmits the generated single content ID (hash ID) 403 to the content information provision server (BDDB).

The content information provision server receives the content ID (hash ID) 403 generated by concatenating the content hash table digests corresponding to the clips, and performs matching processing on content IDs which correspond to pieces of content and which are stored in the content information provision server so that, among the content IDs stored in the content information provision server, a content ID (hash ID) 403 which matches the received content ID is obtained. The content information provision server transmits to the client apparatus pieces of content information such as a music title and a work title corresponding to content specified by the content ID (hash ID) 403 which matches one of the content IDs stored in the content information provision server.

Note that since the content ID (hash ID) 403 is generated by concatenating the content hash table digests corresponding to individual clips, the content information provision server performs the matching processing on the content hash table digests on a clip-by-clip basis.

In a configuration shown in FIG. 9, data generated by concatenating the content hash table digests which correspond to all the clips and which are registered in the content certificate 401 is transmitted to the content information provision server. However, a number of the content hash table digests which correspond to the clips and which are registered in the content certificate 401 may be selected and transmitted to the content information provision server 310 so that pieces of content information are obtained. In this case, the content information provision server (BDDB) performs the matching processing on the number of the content hash table digests corresponding to the clips, and when one of the pieces of content is specified, pieces of content information relating to the specified content are transmitted from the content information provision server (BDDB) to the client apparatus.

Figure 10:
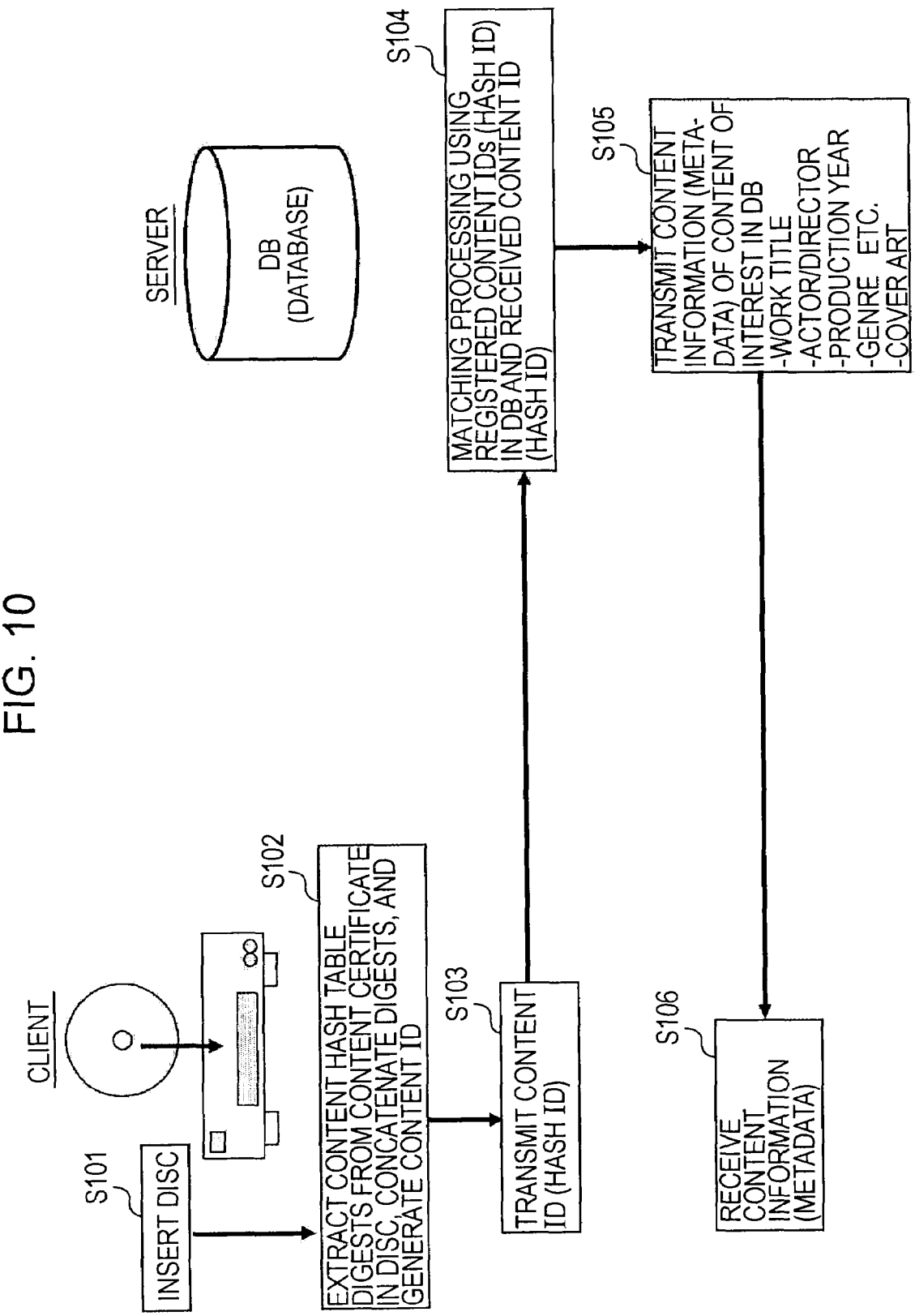
FIG. 10 is a diagram illustrating a sequence of processing steps of obtaining the pieces of content information on the basis of the content identifier (hash ID)

Referring to FIG. 10, a sequence of processing steps performed using the client apparatus which performs processing of obtaining the pieces of content information and using the server which performs processing of providing the pieces of content information will be described. In step S101, a medium (information recording medium) including content is inserted in a reproducing apparatus as the client apparatus. The medium (information recording medium) includes a content certificate corresponding to the content in addition to the content.

In step S102, the reproducing apparatus as the client apparatus reads the content certificate, extracts content hash table digests recorded in the content certificate, and generates a content ID (hash ID) by concatenating the content hash table digests generated on a clip-by-clip basis. Note that in a case where the medium has a plurality of layers therein, and therefore, a plurality of content certificates for individual layers are recorded in the medium, concatenating processing is performed on the content hash table digests as described with reference to FIG. 9 so that a single content ID (hash ID) is generated.

In step S103, the client apparatus transmits the generated content ID (hash ID) to the server. As described above with reference to FIG. 8, the server includes a database having pieces of content information (metadata) corresponding to content IDs (hash IDs).

In step S104, the server performs matching processing of retrieving one of the content IDs (hash IDs) (hereinafter referred to as a "first content ID") registered in the database (DB) which matches the received content ID (hash ID) (hereinafter referred to as a "second content ID"). In step S105, the server transmits, among the pieces of content information (metadata) stored in the database, pieces of content information (metadata) corresponding to the first content ID (hash ID) to the client apparatus. In step S106, the client apparatus receives the pieces of content information (metadata) from the server and outputs or displays the pieces of content information (metadata) in a display apparatus, for example. Note that the pieces of content information (metadata) include a music title, a work title, a CD jacket picture, a performer, a director, a release year, a genre, and cover art.

4. An Example of Processing of Obtaining Content Information Using Hash Values and a Content Certificate Identifier (CCID)

Next, an example of processing of obtaining pieces of content information using a content ID including not only the content hash table digests recorded in the content certificate as described above but also other pieces of identification information recorded in the content certificate will be described.

Figure 11:
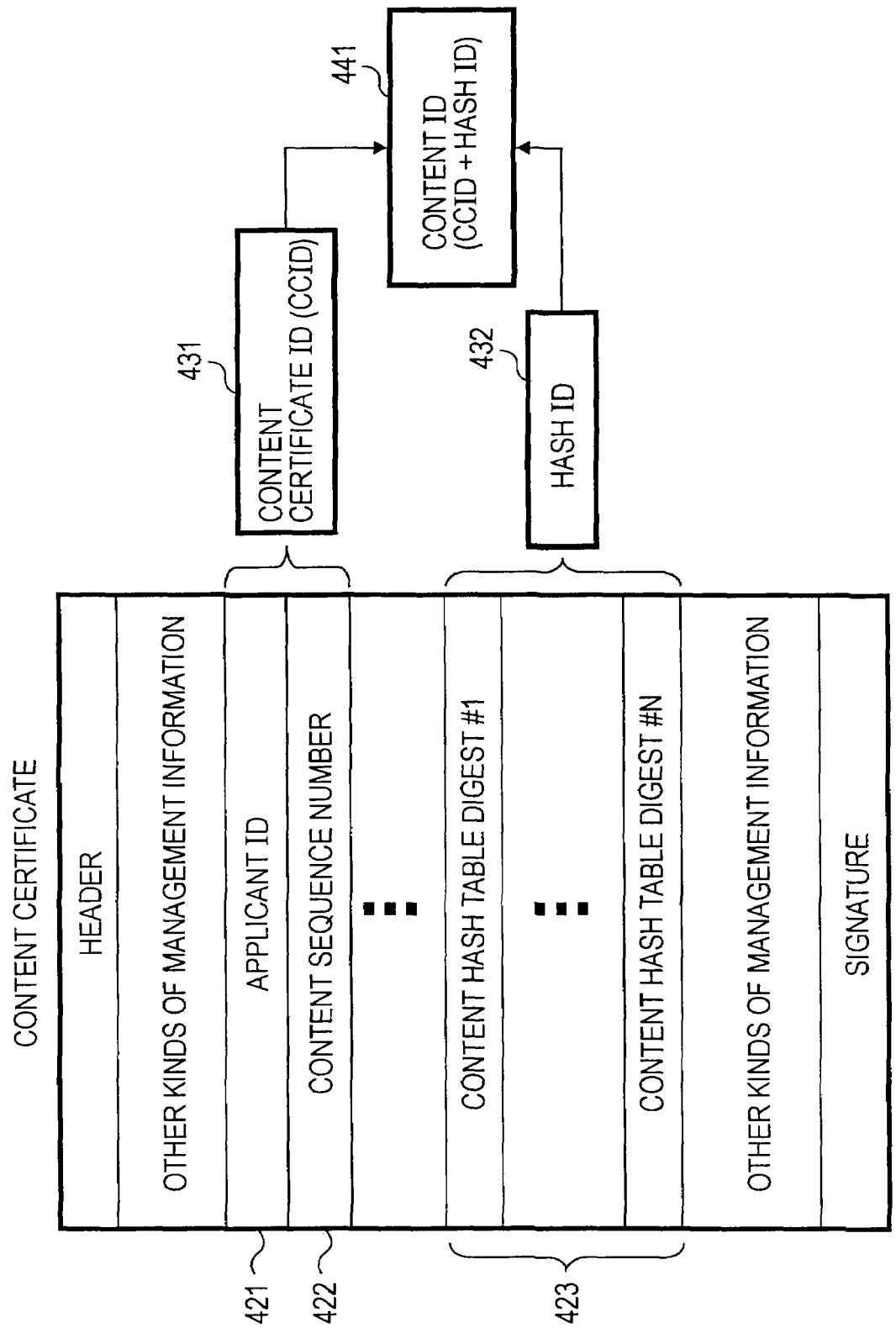
FIG. 11 is a diagram illustrating processing of generating a content identifier on the basis of the content hash table digests and the content certificate identifier (CCID) stored in the content certificate.

FIG. 11 shows a configuration of a content certificate. As described above with reference to FIGS. 3 and 5, the content certificate includes content hash table digests 423 used to check whether content recorded in an information recording medium is valid, an applicant ID 421 used to specify a provider of the content recorded in the information recording medium or a disc manufacturer as a manufacturer of the information recording medium, and a content sequence number 422 which is an identifier corresponding to the applicant ID 421 and the content recorded in the information recording medium.

A combination of the applicant ID 421 and the content sequence number 422 (that is, "Applicant ID (2B)"+"Content Sequence Number (4B)") is referred to as a content certificate ID (CCID) ("Content Certificate ID (6B)").

The content certificate ID (CCID) is a unique ID for the content certificate (CC). The content certificate corresponds to the content recorded in the information recording medium, and therefore, the specific content is selected from among pieces of content recorded in the information recording medium on the basis of the content certificate ID.

An embodiment in which the content certificate ID stored in the content certificate is included in configuration data of the content ID in addition to the content hash table digests described above will be described hereinafter as an example.

As shown in FIG. 11, the client apparatus generates a content certificate ID (CCID) 431 using a combination of the applicant ID 421 and the content sequence number 422 recorded in the content certificate. Furthermore, the client apparatus generates a hash ID 432 using the content hash table digests recorded in the content certificate. In addition, the client apparatus generates a content ID 441 using the content certificate ID (CCID) 431 and the hash ID 432 and transmits the generated content ID 441 to the content information provision server.

Note that processing of generating the content ID 441 using the content certificate ID (CCID) 431 and the hash ID 432 is realized by processing of concatenating the pieces of data, for example. In addition, although the single content certificate is shown in FIG. 11, in a case where a medium has a plurality of layers and therefore a plurality of content certificates for the individual layers are recorded in the medium as described above with reference to FIG. 7, a content ID is generated using applicant IDs, content sequence numbers, and content hash table digests and is transmitted to the content information provision server.

Figure 12:
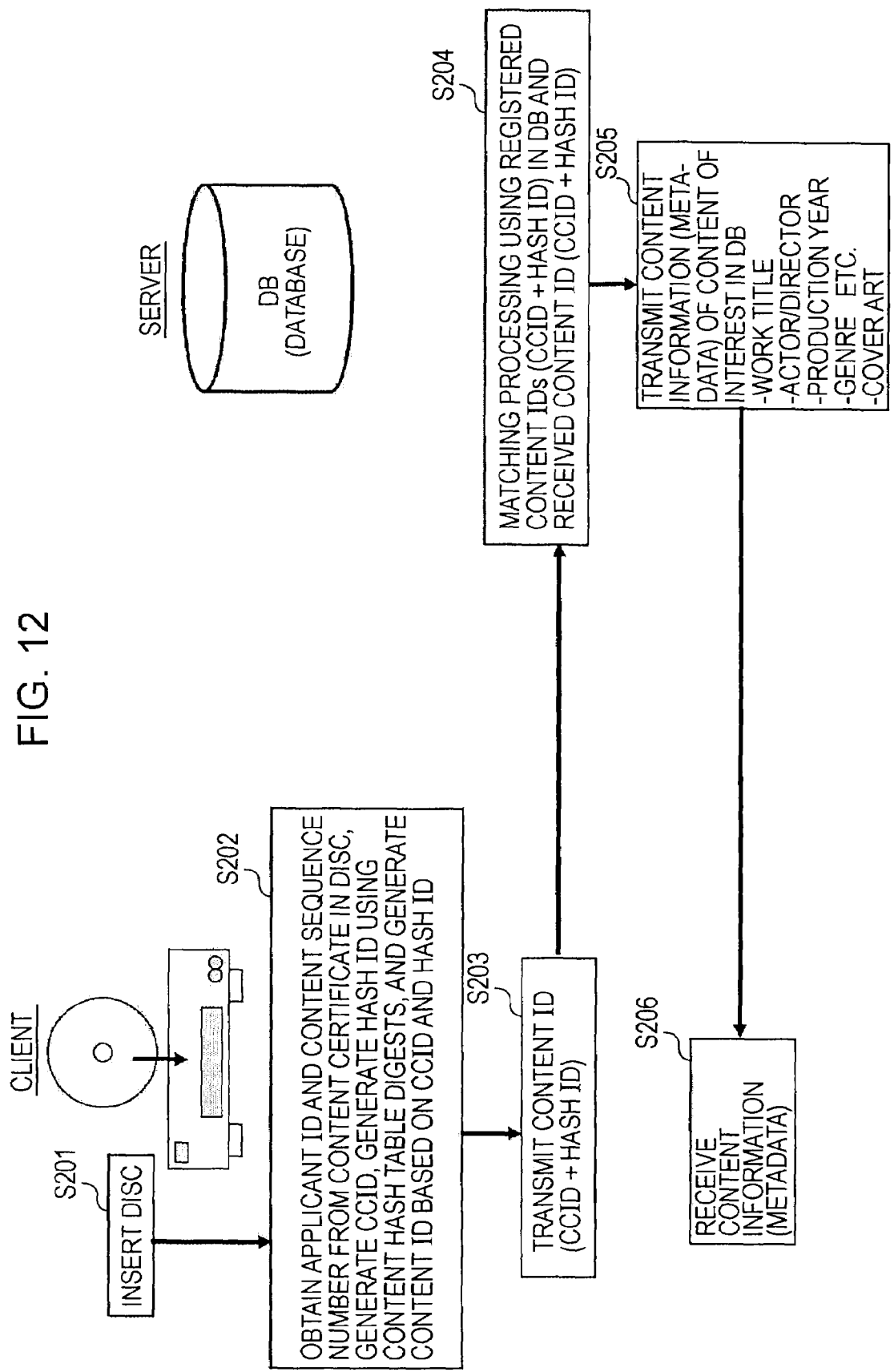
FIG. 12 is a diagram illustrating a sequence of the processing steps of obtaining the pieces of content information on the basis of the content identifier (hash ID+CCID)

Referring to FIG. 12, a sequence of processing steps of generating a content ID (CCID+hash ID) using the content certificate ID (CCID) generated on the basis of the applicant ID and the content sequence number and using the hash ID generated on the basis of the content hash table digests, and obtaining pieces of content information on the basis of the content ID will be described. This sequence of the processing steps is performed using the client apparatus and the server. First, in step S201, a medium (information recording medium) including content is inserted in a reproducing apparatus, that is, the client apparatus. The medium (information recording medium) including the content also includes a content certificate corresponding to the content.

In step S202, the reproducing apparatus, that is, the client apparatus reads the content certificate, obtains an applicant ID and a content sequence number recorded in the content certificate, and generates a content certificate ID (CCID). Furthermore, the reproducing apparatus generates a hash ID using content hash table digests and generates a content ID (CCID+hash ID) on the basis of the CCID and the hash ID. Note that, in a case where a medium having a plurality of layers are employed and therefore a plurality of content certificates for the layers are recorded in the medium, a content ID is generated using applicant IDs, content sequence numbers, and content hash table digests included in the plurality of content certificates.

In step S203, the client apparatus transmits the generated content ID (CCID+hash ID) to the server. The server includes a database having pieces of content information (metadata) corresponding to content IDs (CCID+hash ID).

In step S204, the server performs matching processing of retrieving one of the content IDs (CCID+hash ID) (hereinafter referred to as a "first content ID") registered in the database (DB) which matches the received content ID (CCID+hash ID) (hereinafter referred to as a "second content ID"). In step S205, the server transmits, among the pieces of content information (metadata) stored in the database, pieces of content information (metadata) corresponding to the first content ID (CCID+hash ID) to the client apparatus. In step S206, the client apparatus receives the pieces of content information (metadata) from the server and outputs or displays the pieces of content information (metadata) in a display apparatus, for example.

Note that the pieces of content information (metadata) include a music title, a work title, a CD jacket picture, a performer, a director, a release year, a genre, and cover art.

In this processing example, the content ID is generated using not only the content hash table digests but also the content certificate ID (CCID) generated on the basis of the applicant ID and the content sequence number. Accordingly, the ID matching processing is performed comparatively strictly and matching accuracy is improved.

Note that the applicant ID included in the data constituting the content certificate ID (CCID) is an identifier used to specify a provider of the content recorded in the information recording medium or a disc manufacturer which is a manufacturer of the information recording medium. Accordingly, for example, different manufacturers may provide different applicant IDs to a single piece of content, and therefore, a plurality of content certificate IDs (CCIDa and CCIDb, for example) may be provided for the single piece of content.

Accordingly, when the content information provision server specifies content in accordance with a content ID including a CCID so as to transmit pieces of content information corresponding to the content, processing should be performed taking this condition, that is, the condition in which a plurality of content IDs are provided for a single piece of content, into consideration. An example of this processing will be described with reference to FIG. 13.

Figure 13:
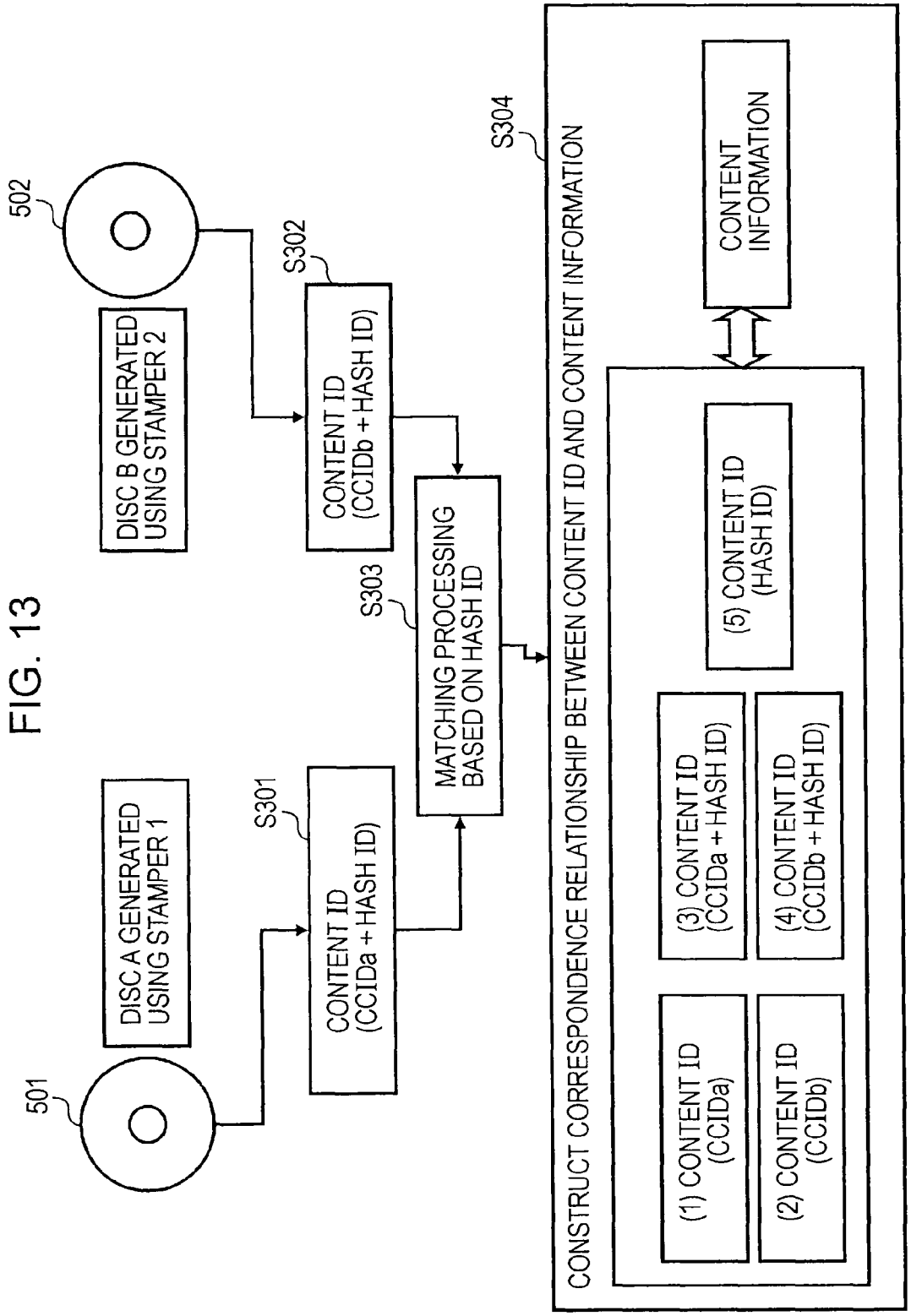
FIG. 13 is a diagram illustrating processing of constructing the correspondence relationship between various content identifiers and pieces of content information.

FIG. 13 shows a disc A 501 and a disc B 502 manufactured using different stampers by different manufacturers. Although identical pieces of content are stored in the disc A 501 and disc B 502, an applicant ID included in a content certificate stored in the disc A 501 and an applicant ID included in a content certificate stored in the disc B 502 are different from each other. Consequently, a content certificate ID (CCIDa) including the applicant ID and a content sequence number for the disc A 501 and a content certificate ID (CCIDa) including the applicant ID and a content sequence number for the disc B 502 are different from each other. That is, CCIDs is not equal to CCIDb.

In step S301 of FIG. 13, the server which manages the database reads the content certificate from the disc A 501 and generates a first content ID (CCIDa+hash ID) on the basis of pieces of data stored in the read content certificate. In step S302, the server reads the content certificate from the disc B 502 and generates a second content ID (CCIDb+hash ID) on the basis of pieces of data stored in the read content certificate.

Furthermore, in step S303, the server compares the first content ID (CCIDa+hash ID) read from the disc A 501 with the second content ID (CCIDb+hash ID) read from the disc B 502. In this comparison processing, only data portions corresponding to the hash IDs of the disc A 501 and the disc B 502 are compared with each other so that it is determined whether the hash ID of the disc A 501 matches the hash ID of the disc B 502. Basically, when pieces of content included in discs are identical, the hash IDs for the pieces of content included in the discs are also identical even when stampers and disc manufacturers are different.

When the hash ID included in the first content ID (CCIDa+hash ID) read from the disc A 501 and the hash ID included in the second content ID (CCIDb+hash ID) read from the disc B 502 coincide with each other, it is determined that the CCIDa, the CCIDb, and the hash IDs which are pieces of data constituting the content IDs correspond to identical content. Then, in step S304, the relationship between the content IDs and pieces of content information is constructed as shown in step S304.

Specifically, it is determined that
(1) content ID (CCIDa),
(2) content ID (CCIDb),
(3) content ID (CCIDa+hash ID),
(4) content ID (CCIDb+hash ID), and
(5) content ID (hash ID)
correspond to identical content, and a database is configured such that pieces of content information corresponding to the content are extracted on the basis of any of the content IDs.

Since the database is thus constituted, when receiving any of the various content IDs (1) to (5) from the client apparatus, the server properly selects the pieces of content information corresponding to the content and provides the client apparatus with the pieces of content information.

5. Recommendation Content Information Provision Processing on the Basis of a User's Preference An example of processing of selecting content in accordance with a user's preference and transmitting pieces of content information corresponding to the selected content to the client server from the content information provision server will now be described.

Figure 14:
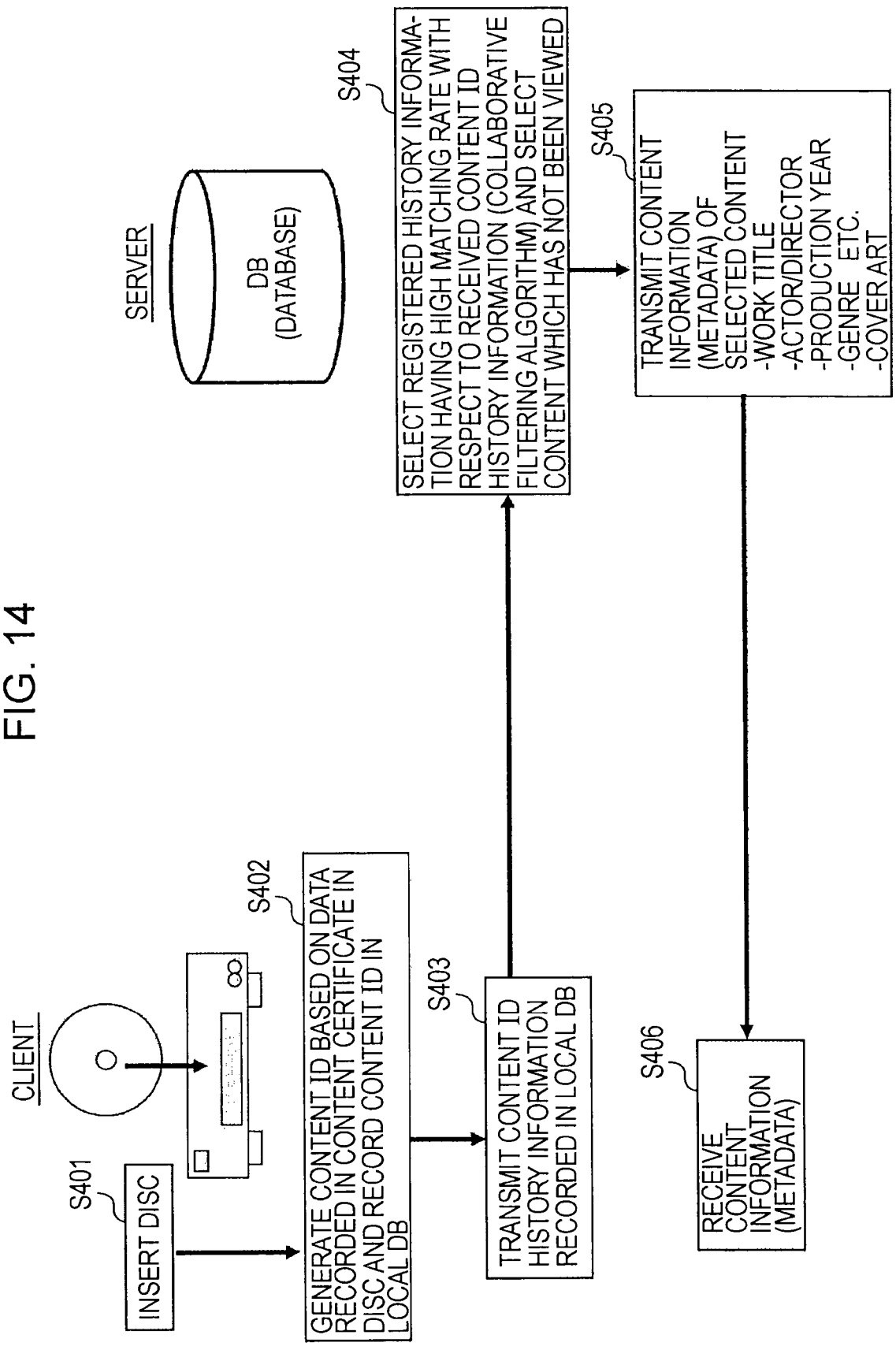
FIG. 14 is a diagram illustrating a sequence of the processing steps of providing pieces of content information by selecting recommendation content in accordance with a user's preference on the basis of a content identifier.

Referring to FIG. 14, an example of a sequence of processing steps of selecting content in accordance with a user's preference and providing pieces of content information corresponding to the selected content will be described. In step S401, a medium (information recording medium) including content is inserted into the reproducing apparatus. The medium (information recording medium) including the content also stores a content certificate corresponding to the content therein.

In step S402, the reproducing apparatus, that is, the client apparatus, reads the content certificate and generates a content ID on the basis of pieces of data recorded in the content certificate. Note that, in this example, the content ID is selected from among the following three IDs:
(1) a hash ID generated using content hash table digests,
(2) a combination of a content certificate ID (CCID) including an applicant ID and a content sequence number and a hash ID, and
(3) a content certificate ID (CCID).

The client apparatus records the generated content ID in a local database included in the reproducing apparatus. The local database included in the reproducing apparatus is used to successively store therein content IDs corresponding to pieces of content which have been reproduced using the reproducing apparatus as pieces of history information corresponding to pieces of reproducing time and data.

In step S403, the client apparatus transmits content ID history information representing the content ID thus registered in the local database included in the reproducing apparatus to a server. The server includes a content information database used to store therein pieces of content information (metadata) corresponding to content IDs (CCID+hash ID) and further includes a usage history database used to store therein pieces of content ID history information transmitted from various client apparatuses. For example, as shown in FIG. 15, pieces of content ID history information transmitted from client apparatuses (users) are recorded in the usage history database.

In step S404, the server selects one of the pieces of content ID history information which have been registered, the one having a high matching rate with respect to the content ID history information transmitted from the client apparatus, from the usage history database shown in FIG. 15 so as to select recommendation content which has not been used in accordance with a user's preference. Note that the selecting processing is performed in accordance with the collaborative filtering algorithm.

The collaborative filtering algorithm will be described with reference to FIG. 16. The collaborative filtering algorithm is a method for estimating that the same preference may be found even in a "nonmatching portion" based on "matching rate" of preference trends of a plurality of users. For example, as shown in FIG. 16, content usage history information of a user X represents that the user X has used pieces of content A, B, C, D, and E and content usage history information of a user Y represents that the user Y has used pieces of content B, C, D, E, and F. In this case, it is determined that "matching portion" including pieces of content which have been used by both of the users X and Y is large, and therefore, it is determined that the user X and the user Y have similar preferences. Accordingly, it is determined that the user Y may desire to use one of the pieces of content which is included in the content usage history information of the user X but which is not included in the content usage history information of the user Y whereas it is determined that the user X may desire to use one of the pieces of content which is included in the content usage history information of the user Y but which is not included in the content usage history information of the user X. This is the collaborative filtering algorithm.

Referring back to FIG. 14, in step S404, the server selects one of the pieces of history information registered in the usage history database (refer to FIG. 15) which has a high matching rate with respective to the content ID history information transmitted from the client apparatus to thereby select recommendation content in which the user has not been used in accordance with the user's preference by the collaborative filtering algorithm.

In step S405, the server obtains pieces of content information (metadata) corresponding to selected recommendation content from the content information database and transmits the pieces of content information (metadata) to the client apparatus. In step S406, the client apparatus outputs or displays the pieces of content information (metadata) transmitted from the server in the display apparatus, for example. Note that the pieces of content information (metadata) include a music title, a work title, a CD jacket picture, a performer, a director, a release year, a genre, and cover art.

In this processing example, since content which is estimated that a user desires to use is determined on the basis of pieces of history data corresponding to content IDs transmitted from a client apparatus and pieces of content information corresponding to the estimated content are transmitted to the client apparatus, a user's preference is properly determined and processing of providing the client apparatus with pieces of content information corresponding to proper content in accordance with the user's preference is realized.

6. A Configuration of an Information Processing Apparatus

Referring to FIGS. 17 and 18, an information processing apparatus (such as a reproducing apparatus) which obtains pieces of content information by transmitting a content ID (hash ID) generated on the basis of content hash table digests stored in a content certificate, a content certificate ID (CCID), or a content ID constituted by a combination thereof to a server and an information processing apparatus serving as the server which receives the content ID and which transmits the pieces of content information will be described.

Referring to FIG. 17, a function and a configuration of an information processing apparatus (client apparatus) which obtains pieces of content information by transmitting the content ID to a server will be described. As shown in FIG. 17, the information processing apparatus includes a data transmitting/receiving unit 801, a controller 802, a content ID generation unit 803, a recording and reproducing controller 804, a storage unit 805, a data output unit 806, and a medium I/F 807. The data transmitting/receiving unit 801 transmits data to the server and receives data from the server. The controller 802 integrally controls data processing of the information processing apparatus. The content ID generation unit 803 reads a content certificate 811 which is recorded in an information recording medium 810 and which corresponds to content recorded in the information recording medium 810, and obtains hash table digests and a content certificate ID (CCID) from the content certificate 811 to generate a content ID. The recording and reproducing controller 804 controls processing of reproducing the content recorded in the information recording medium 810 and processing of recording (copying) the content recorded in the information recording medium 810. The storage unit 805 stores processing programs therein. The data output unit 806 includes, for example, a display unit which displays data. The medium I/F 807 is compatible with the information recording medium 810.

The content ID generation unit 803 reads the content certificate 811 which corresponds to the content and which is recorded in the information recording medium 810 and generates a content ID by combining hash values which correspond to content and which are included in the content certificate. Specifically, the content ID generation unit 803 generates the content ID by obtaining content hash table digests and a content certificate ID (CCID). Specifically, as described above, the content ID generation unit 803 generates a content ID using any one of the following IDs:

(1) a hash ID generated using the content hash table digests
(2) a combination of the content certificate ID (CCID) including an applicant ID and a content sequence number and the hash ID, and
(3) the content certificate ID.

Note that, as described above, the content ID generation unit 803 checks a digital signature recorded in the content certificate 811. When it is determined that the content certificate 811 is not falsified, that is, the content certificate 811 a valid certificate, the content ID generation unit 803 obtains data stored in the content certificate 811 to generate the content ID.

The data transmitting/receiving unit 801 transmits the content ID generated using the content ID generation unit 803 to a content information provision server, and receives pieces of content information relating to content specified on the basis of the content ID from the content information provision server. The pieces of content information are transmitted through the data transmitting/receiving unit 801 to the data output unit 806. The data output unit 806 displays the pieces of content information in the display unit.

Specifically, the data transmitting/receiving unit 801 receives the pieces of content information such as a music title, a work title, and a CD jacket picture relating to the content stored in the information recording medium 810 from the content information provision server. The data output unit 806 displays these pieces of content information in the display unit.

Note that, as described above with reference to FIGS. 14 to 16, content ID history data generated using the content ID generation unit 803 in accordance with data included in the content certificate 811 stored in the information recording medium 810 which has been reproduced using the client apparatus or which has been inserted in the client apparatus is recorded in the storage unit 805. The generated content ID history data is transmitted to the server through the data transmitting/receiving unit under control of the controller 802.

Referring now to FIG. 18, a configuration and a function of a server which receives a content ID from the client apparatus, that is, a user device, which obtains pieces of content information relating to content to be reproduced on the basis of the content ID, and which transmits the pieces of content information to the user device will be described.

As shown in FIG. 18, a content information provision server includes a controller 901, a data retrieving unit 902, a data transmitting/receiving unit 903, a database 910, and a storage unit 906. The controller 901 entirely controls generation and output of data. The data retrieving unit 902 searches the database 910 for pieces of content information. The data transmitting/receiving unit 903 transmits data to the user device and receives data from the user device. The storage unit 906 stores various data processing programs therein. The database 10 includes a content information database 911 and a usage history database 912. The content information database 911 stores therein pieces of content information for pieces of content corresponding to content IDs. The usage history database 912 stores therein pieces of usage history information of users, and is described above with reference to FIG. 15.

When the data transmitting/receiving unit 903 receives, from the client apparatus, a content ID generated using pieces of data included in the content certificate recorded in the information recording medium, for example, a content ID selected from the following IDs:
(1) a hash ID generated using content hash table digests
(2) a combination of a content certificate ID (CCID) including an applicant ID and a content sequence number and a hash ID, and
(3) the content certificate ID, the data retrieving unit 902 searches the content information database 911 for pieces of content information relating to content specified on the basis of the content certificate ID and obtains the pieces of content information from the content information database 911. Furthermore, the data transmitting/receiving unit 903 transmits the pieces of content information obtained using the data retrieving unit 902 to the user device.

The data retrieving unit 902 obtains, from the content information database 911, as the pieces of content information, pieces of data such as a music title, a work title, and a CD jacket picture, which relate to the content recorded in the information recording medium loaded in the user device. The data transmitting/receiving unit 903 transmits the pieces of content information to the user device.

When receiving content IDs from client apparatuses, the server records the content IDs on a user-by-user basis (on a client-by-client basis) in the usage history database 912. Furthermore, as described with reference to FIGS. 14 to 16, the data retrieving unit 902 performs the collaborative filtering algorithm using data recorded in the usage history database 912 so as to select unused content recommended so as to match a user's preference, extracts pieces of content information corresponding to the selected content from the content information database 911, and transmits the pieces of content information through the data transmitting/receiving unit 903 to the user device.

The present invention is described with reference to the embodiment described above. However, it should be understood by those skilled in the art that various modifications, and substitutions may occur insofar as they are within the scope of the invention. That is, the embodiments are merely examples and the present invention is not limited to them. An outline of the present invention will be understood with reference to claims.

Note that the series of processes described herein may be executed using hardware, software, or a combination of hardware and software. In a case where the series of processes is executed using software, a program including a processing sequence is installed in a memory included in dedicated hardware of a computer to execute the series of processes, or the program is installed in a general computer capable of executing various processes to execute the series of processes. For example, the program may be recorded in a recording medium in advance. The program may be installed into the computer from the recording medium, and in addition, the program may be downloaded via a LAN (Local Area Network) or the Internet using a network to the computer. The computer receives the program thus transmitted and installs the program in a recording medium such as an incorporated hard disc.

The various processes described herein may be executed in a time-series manner in an order of the descriptions of the processes. Alternatively, the various processed may be executed in parallel or individually according to processing capability of an apparatus which executes the processes or as needed. The "system" described herein means a configuration in which a plurality of apparatuses are logical integrated, and is not limited to a configuration in which a plurality of apparatuses having own configurations are stored in one case.

What is claimed is:

1. An information processing apparatus that obtains pieces of content information relating to content recorded in an information recording medium, the information processing apparatus comprising:
   a content identifier generation unit configured
      to read a content certificate corresponding to the content stored in the information recording medium, the content certificate being recorded in the information recording medium and including content hash table digests generated as digest values based on hash values recorded in a content hash table, the hash values being generated based on hash units included as configuration data in the content, and
      to generate a content identifier by combining the content hash table digests in an order based on a location of the hash units in the information recording medium;
   a data transmitting unit configured to transmit the content identifier to a content information provision server;
   a data receiving unit configured to receive, from the content information provision server, pieces of content information relating to the content, the pieces of content information being based on the transmitted content identifier; and
   a data outputting unit configured to output the pieces of content information.

2. The information processing apparatus according to claim 1, wherein the content identifier generation unit obtains the content hash table digests, and
   concatenates the obtained content hash table digests to generate the content identifier.

3. The information processing apparatus according to claim 2, wherein
   the content certificate includes the content hash table digests generated on a clip-by-clip basis, a clip being a unit of reproduction of the content, and
   the content identifier generation unit
      obtains the content hash table digests on a clip-by-clip basis, and concatenates the obtained content hash table digests in clip order to generate the content identifier.

4. The information processing apparatus according to claim 3, wherein
the content certificate is recorded in each of a plurality of recording layers in the information recording medium, and
the content identifier generation unit
obtains content hash table digests recorded in a plurality of content certificates for individual recording layers, and
concatenates the obtained content hash table digests in clip order and in layer order to generate the content identifier.

5. The information processing apparatus according to claim 1, wherein the content identifier generation unit generates the content identifier by combining the content hash table digests and a content certificate identifier (CCID), the CCID including
an applicant identifier configured to specify a provider of the content or a disc manufacturer of the information recording medium, and
a content sequence number corresponding to the applicant identifier and the content.

6. The information processing apparatus according to claim 1, wherein
the content identifier generation unit records a content identifier generated based on data included in the content certificate so as to correspond to the content recorded in the information recording medium of a storage unit as history data,
the data transmitting unit transmits content identifier history data recorded in the storage unit to a content information provision server, and
the data receiving unit receives, from the content information provision server, pieces of content information relating to recommendation content specified based on the content identifier history data.

7. The information processing apparatus according to claim 1,
wherein
the content certificate includes
the content certificate identifier,
pieces of data including content hash table digests, and
a digital signature assigned thereto, and
the content identifier generation unit
checks validity of the digital signature to check validity of the content certificate and the content, and
obtains the data from the content certificate and generates the content identifier based on the obtained data when the content certificate and content are valid.

8. An information processing apparatus serving as a server that receives a content identifier from a client apparatus and provides a client apparatus with pieces of content information relating to the received content identifier, the information processing apparatus comprising:
a data receiving unit configured to receive, from the client apparatus, a content identifier generated by combining hash table digests in an order based on a location of hash units in the information recording medium, the hash table digests being
included in a content certificate recorded in an information recording medium of the client apparatus, and
generated as digest values based on hash values recorded in a content hash table, the hash values being generated based on hash units included as configuration data in content recorded in the information recording medium;
a database including content identifiers and pieces of content information which relate to pieces of content corresponding to the content identifiers;
a data retrieving unit configured to obtain the pieces of content information relating to the content, the pieces of content information being based on the received content identifier; and
a data transmitting unit configured to transmit the pieces of content information to the client apparatus.

9. The information processing apparatus according to claim 8, wherein
the content identifier is generated by concatenating the content hash table digests, and
the data retrieving unit
searches a database for the pieces of content information relating to the content specified based on the content identifier, and
obtains the pieces of content information relating to the content based on the content identifier from the database.

10. The information processing apparatus according to claim 9, wherein
the content hash table digests are recorded in the content certificate on a clip-by-clip basis, a clip being a unit of reproduction of content,
the data receiving unit receives the content identifier generated by concatenating the content hash table digests on a clip-by-clip basis, and
the data retrieving unit recognizes individual clips included in the content identifier and performs retrieving processing on the database based on results of recognition.

11. The information processing apparatus according to claim 8, wherein the data receiving unit receives the content identifier and a content certificate identifier (CCID), the CCID including
an applicant identifier configured to specify a provider of the content or a disc manufacturer of the information recording medium, and
a content sequence number corresponding to the applicant identifier and the content.

12. The information processing apparatus according to claim 8, further comprising:
a usage history database configured to store pieces of history data corresponding to content identifiers transmitted from client apparatuses,
wherein the data retrieving unit
analyzes a preference by comparing the content identifier transmitted from the client apparatus with data stored in the usage history database,
selects recommendation content in accordance with the preference, and
obtains pieces of content information relating to the selected recommendation content from the database, and
the data transmitting unit transmits the pieces of content information obtained to the client apparatus.

13. The information processing apparatus according to claim 12, wherein the data retrieving unit selects the recommendation content which matches the preference in accordance with a collaborative filtering algorithm.

14. An information processing method implemented by an information processing apparatus for obtaining pieces of content information relating to content recorded in an information recording medium, the information processing method comprising:

reading, at a content identifier generation unit, a content certificate recorded in the information recording medium and corresponding to the content, the content certificate including content hash table digests generated as digest values based on hash values recording in a content hash table, the hash values being generated based on hash units included as configuration data in the content;

generating, at the content identifier generation unit, a content identifier by combining the content hash table digests in an order based on a location of the hash units in the information recording medium;

transmitting, at a data transmitting unit, the generated content identifier to a content information provision server;

receiving, from the content information provision server, the pieces of content information relating to the content, the pieces of content information being based on the content identifier; and outputting, via a data outputting unit, the received pieces of content information.

15. The information processing method according to claim 14, wherein the content hash table digests are obtained and concatenated to generate the content identifier.

16. The information processing method according to claim 15, wherein
the content certificate includes the content hash table digests generated on a clip-by-clip basis, a clip being a unit of reproduction of the content, and
the content hash table digests recorded on a clip-by-clip basis are obtained and concatenated in clip order to generate the content identifier.

17. The information processing method according to claim 16, wherein
the content certificate is recorded in each of a plurality of recording layers in the information recording medium, and
content hash table digests recorded in the plurality of content certificates for individual recording layers are obtained and concatenated in clip order and in layer order to generate the content identifier.

18. The information processing method according to claim 14, wherein the content identifier is generated by combining the content hash table digests and a content certificate identifier (CCID), the CCID including
an applicant identifier configured to specify a provider of the content or a disc manufacturer of the information recording medium, and
a content sequence number corresponding to the applicant identifier and the content.

19. The information processing method according to claim 14, further comprising:
recording, at the content identifier generation unit, the content identifier generated based on the data included in the content certificate so as to correspond to the content recorded in the information recording medium of a storage unit as history data;
transmitting, at the data transmitting unit, content identifier history data recorded in the storage unit to a content information provision server; and
receiving, from the content information provision server, pieces of content information relating to recommendation content specified based on the content identifier history data.

20. The information processing apparatus according to claim 14, wherein
the content certificate includes
the content certificate identifier,
pieces of data including content hash table digests, and
a digital signature assigned thereto, and the information processing apparatus further comprises:
checking, at the content identifier generation unit, validity of the digital signature so as to check validity of the content certificate and the content, and
obtaining, at the content identifier generation unit, data from the content certificate when the content certificate and content are valid; and
generating, at the content identifier generation unit, the content identifier based on the obtained data when the content certificate and content are valid.

21. An information processing method of an information processing apparatus serving as a server, the information processing apparatus receiving a content identifier from a client apparatus and providing a client apparatus with pieces of content information relating to the received content identifier, the information processing method comprising:
receiving, from the client apparatus, a content identifier generated by combining hash table digests in an order based on a location of hash units in the information recording medium, the hash table digests being
included in a content certificate recorded in an information recording medium of the client apparatus, and
generated as digest values based on hash values recorded in a content hash table, the hash values being generated based on hash units included as configuration data in content recorded in the information recording medium;
searching a database, having content identifiers and pieces of content information which relate to pieces of content corresponding to the content identifiers, for the pieces of content information relating to the content, the pieces of content information being based on the received content identifier; and
transmitting, via a data transmitting unit, the obtained pieces of content information to the client apparatus.

22. The information processing method according to claim 21, wherein
the content identifier is generated by concatenating the content hash table digests and is received, and
the database is searched for the pieces of content information relating to the content based on the content identifier, and
the pieces of content information relating to the content based on the content identifier are obtained from the database.

23. The information processing method according to claim 22, wherein
the content hash table digests are recorded in the content certificate on a clip-by-clip basis, a clip being a unit of reproduction of content recorded in the information recording medium,
the content identifier generated by concatenating the content hash table digests on a clip-by-clip basis is received, and
the content identifier is recognized as individual clips and from the database based on results of recognition.

24. The information processing method according to claim 21, wherein the content identifier is generated by combining the content hash table digests and a content certificate identifier (CCID), the CCID including an applicant identifier configured to specify a provider of the content or a disc manufacturer of the information recording medium, and a content sequence number corresponding to the applicant identifier and the content.

25. The information processing method according to claim 21, further comprising:

analyzing, at a data retrieving unit, a preference by comparing the content identifier transmitted from the client apparatus with pieces of history data included in a usage history database which correspond to content identifiers transmitted from client apparatuses;

selecting, at the data retrieving unit, recommendation content in accordance with the preference;

obtaining, at the data retrieving unit, pieces of content information relating to the selected recommendation content from the database; and transmitting, at the data transmitting unit, the obtained pieces of content information to the client apparatus.

26. The information processing method according to claim 25, wherein the recommendation content matching the preference is selected in accordance with a collaborative filtering algorithm.

27. A non-transitory computer-readable medium storing computer-readable instructions thereon that when executed by an information processing apparatus cause the information processing apparatus to perform a method of obtaining pieces of content information relating to content recorded in an information recording medium, the method comprising:

reading a content certificate recorded in the information recording medium and corresponding to the content stored in the information recording medium, the content certificate including content hash table digests generated as digest values based on hash values recorded in a content hash table, the hash values being generated based on hash units included as configuration data in the content, generating a content identifier by combining the content hash table digests in an order based on a location of the hash units in the information recording medium;

transmitting the generated content identifier to a content information provision server;

receiving, from the content information provision server, pieces of content information relating to the content, the pieces of content information being based on the content identifier; and outputting the received pieces of content information.

28. A non-transitory computer-readable medium storing computer-readable instructions thereon that when executed by an information processing apparatus, serving as a server that receives a content identifier from a client apparatus and providing a client apparatus with pieces of content information relating to the received content identifier, cause the information processing apparatus to perform a method comprising:

receiving, from the client apparatus, a content identifier generated by combining hash table digests in an order based on a location of hash units in the information recording medium, the hash table digests being included in a content certificate recorded in the information recording medium of the client apparatus, and generated as digest values based on hash values recorded in a content hash table, the hash values being generated based on hash units included as configuration data in content recorded in the information recording medium;

searching a database, having content identifiers and pieces of content information which relate to pieces of content corresponding to the content identifiers, for the pieces of content information relating to the content specified based on the received content identifier; and transmitting the obtained pieces of content information to the client apparatus.

* * * * *